US011123829B2

(12) United States Patent
Balaschak et al.

(10) Patent No.: US 11,123,829 B2
(45) Date of Patent: Sep. 21, 2021

(54) FIXTURE INCLUDING SUPPORTS FOR HOLDING VARIOUS COMPONENTS

(71) Applicant: General Electric Company, Schenectady, NY (US)

(72) Inventors: Edward James Balaschak, Simpsonville, SC (US); Robert Peter Hanet, Canton, MI (US)

(73) Assignee: General Electric Company, Schenectady, NY (US)

( * ) Notice: Subject to any disclaimer, the term of this patent is extended or adjusted under 35 U.S.C. 154(b) by 243 days.

(21) Appl. No.: 16/002,063

(22) Filed: Jun. 7, 2018

(65) Prior Publication Data
US 2019/0375061 A1    Dec. 12, 2019

(51) Int. Cl.
*B23Q 3/06* (2006.01)

(52) U.S. Cl.
CPC .......... *B23Q 3/062* (2013.01); *B23Q 2703/02* (2013.01)

(58) Field of Classification Search
CPC .... B23Q 3/062; B23Q 3/063; B23Q 2703/02; B23Q 2703/10; B23Q 7/047
USPC .. 269/56.6, 265, 268, 280, 289 R, 309, 310, 269/900, 902, 346.02, 346.03; 248/430
See application file for complete search history.

(56) References Cited

U.S. PATENT DOCUMENTS

| | | | | |
|---|---|---|---|---|
| 1,477,219 A | * | 12/1923 | Halvorsen | B25B 5/006 269/60 |
| 2,865,499 A | * | 12/1958 | Brogren | B65D 81/075 206/386 |
| 2,932,995 A | * | 4/1960 | Durfee | B23B 47/281 408/115 R |
| 3,894,326 A | * | 7/1975 | Merriman | F16L 1/26 29/281.5 |
| 4,139,093 A | * | 2/1979 | Holmes | G07D 9/004 206/0.82 |
| 4,305,508 A | * | 12/1981 | Rodgers | B65D 19/0095 108/55.3 |
| 4,445,678 A | * | 5/1984 | George | B23Q 3/104 269/282 |
| 6,505,678 B2 | | 1/2003 | Mertins | |

(Continued)

FOREIGN PATENT DOCUMENTS

DE    102004056142 A1 *  6/2006  ............... B25B 5/08

*Primary Examiner* — Joseph J Hail
*Assistant Examiner* — J Stephen Taylor
(74) *Attorney, Agent, or Firm* — James Pemrick; Hoffman Warnick LLC

(57) ABSTRACT

Fixtures including supports for holding various components are disclosed. The fixtures may include a first member including two opposing side rails positioned opposite and parallel to one another, and at least two supports extending between each of the two opposing side rails. The at least two supports may contact removable features formed on the component. The fixture may also include a second member contacting the first member. The second member may include two opposing side rails positioned opposite and parallel to one another. The two opposing side rails of the second member may be positioned on and may contact the two opposing side rails of the first member. The second member may also include at least one support extending between the two opposing side rails of the second member. The at least one support may contact removable features formed on the component.

20 Claims, 21 Drawing Sheets

(56) References Cited

U.S. PATENT DOCUMENTS 8,516,676 B2 8/2013 High
2011/0049087 A1* 3/2011 Ferguson ............ H01L 21/6776
216/13

* cited by examiner

FIXTURE INCLUDING SUPPORTS FOR HOLDING VARIOUS COMPONENTS

BACKGROUND OF THE INVENTION

The disclosure relates generally to fixtures for holding components, and more particularly, to a fixture including a plurality of supports that are configured to hold various components having distinct shapes and/or features.

In creating or building components, a variety of manufacturing and/or machining processes may be performed. Specifically, when forming a component from raw material (e.g., solid blocks of material), the component may undergo a variety of manufacturing and/or machining processes that may remove material, shape or distort the material, harden the material, add features to the material, and the like. However, as the processes performed near closer to a finish and/or the component is nearly formed and/or complete, the component may include portions and/or features that cannot withstand the material, chemical, and/or mechanical stress or strain experienced by the component when performing the manufacturing processes. For example, where a component includes a thinned and/or hollowed sidewall, performing a machining process (e.g., drilling, milling, grinding, blasting, and so on) on the component may result in the component experiencing vibrations and/or mechanical stress or strain. As a result of the vibrations and/or mechanical stress or strain, these portions and/or features (e.g., thinned and/or hollowed sidewall) may be come weakened or damaged. Weakened or damaged portions or features of the component may reduce the operational life of the component and/or may require early and undesirable maintenance or replacement of the component.

To help reduce the risk of damage and/or lessen the material, chemical, and/or mechanical stress or strain experienced by the component when performing the manufacturing processes, the components may be secured within custom fittings, housings or casings. These custom casings hold and/or secure the component therein and help to protect the component, and its unique portions or features, when performing the manufacturing processes to form the component. However, custom casings are built specifically for a single component. As a result, when manufacturing a plurality of components for a system or assembly, each component requires its own custom casing. Requiring an individual custom casing for each component being manufactured requires a large amount of storage space for each of the casings. Additionally, each of the custom casings are expensive to manufacture and maintain. As a result, most manufacturers only have a single casing for each component. If the custom casing becomes damaged and/or unable to adequately protect the component when performing manufacturing processes, the casing must be replaced. Replacing the custom casing is expensive, time consuming, and can result in an inability to manufacture the component specific to the custom casing until another custom casing can be created.

BRIEF DESCRIPTION OF THE INVENTION

A first aspect of the disclosure provides a fixture for holding a component. The component including a plurality of removable features formed on a first surface and a second surface of the component. The fixture includes: a first member including: two opposing side rails positioned opposite and parallel to one another; and at least two supports extending between and coupled to each of the two opposing side rails, the at least two supports contacting the plurality of removable features formed on the first surface of the component; and a second member contacting the first member, and for positioning the component between the first member and the second member, the second member including: two opposing side rails positioned opposite and parallel to one another, the two opposing side rails of the second member positioned on and contacting the two opposing side rails of the first member; and at least one support extending between and coupled to each of the two opposing side rails of the second member, the at least one support contacting the plurality of removable features formed on the second surface of the component.

A second aspect of the disclosure provides an assembly including: a component including: a first surface; a second surface positioned opposite the first surface; and a plurality of removable features formed on the first surface and the second surface; and a fixture for holding the component, the fixture including: a first member including: two opposing side rails positioned opposite and parallel to one another; and at least two supports extending between and coupled to each of the two opposing side rails, the at least two supports contacting the plurality of removable features formed on the first surface of the component; and a second member contacting the first member, and for positioning the component between the first member and the second member, the second member including: two opposing side rails positioned opposite and parallel to one another, the two opposing side rails of the second member positioned on and contacting the two opposing side rails of the first member; and at least one support extending between and coupled to each of the two opposing side rails of the second member, the at least one support contacting the plurality of removable features formed on the second surface of the component.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As indicated above, the disclosure provides fixtures for holding components, and more particularly, fixtures including a plurality of supports that are configured to hold various components having distinct shapes and/or features.

These and other embodiments are discussed below with reference to FIGS. 1-33. However, those skilled in the art will readily appreciate that the detailed description given herein with respect to these Figures is for explanatory purposes only and should not be construed as limiting.

Figure 1:
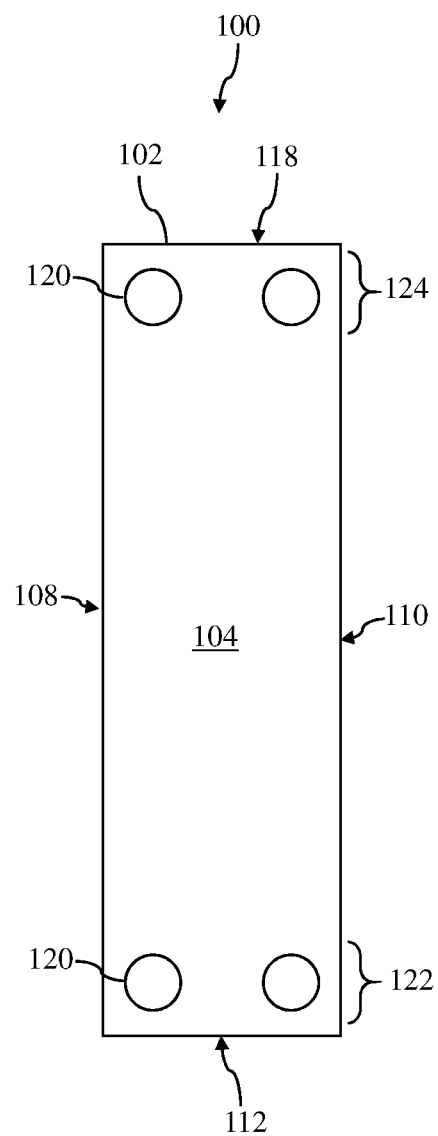
FIG. 1 shows a bottom view of a component including removable features, according to embodiments of the disclosure.
Figure 2:
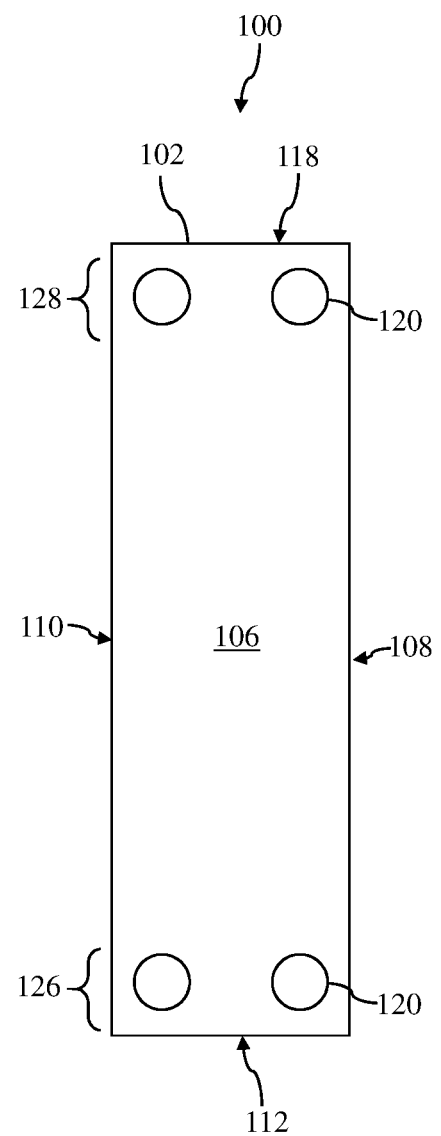
FIG. 2 shows a top view of the component including the removable features of FIG. 1, according to embodiments of the disclosure.
Figure 3:
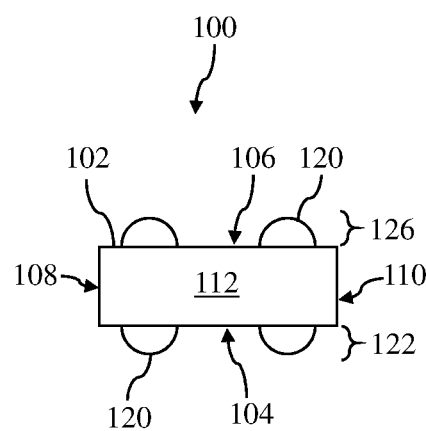
FIG. 3 shows a front view of the component including the removable features of FIG. 1, according to embodiments of the disclosure.
Figure 4:
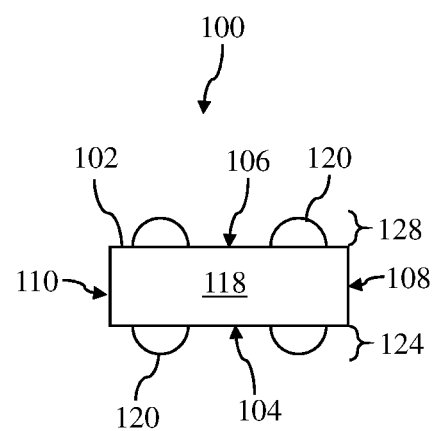
FIG. 4 shows a back view of the component including the removable features of FIG. 1, according to embodiments of the disclosure.
Figure 5:
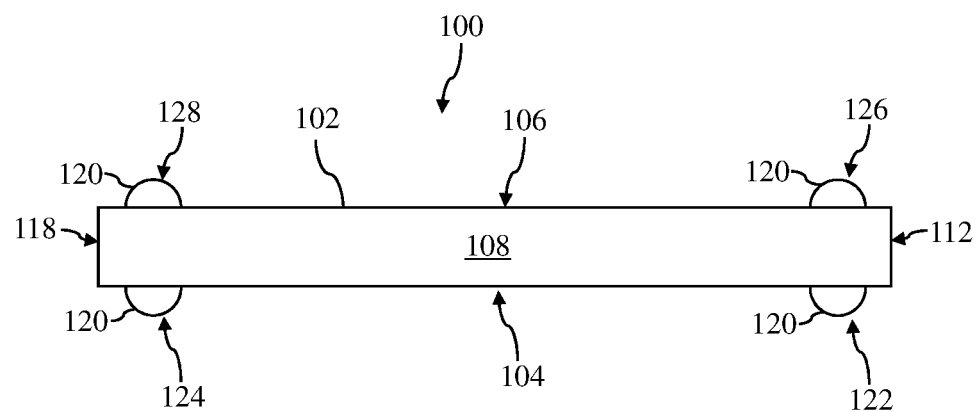
FIG. 5 shows a side view of the component including the removable features of FIG. 1, according to embodiments of the disclosure.

FIGS. 1-5 show various views of a component 100. Specifically, FIG. 1 shows a bottom view of component 100, FIG. 2 shows a top view of component 100, FIG. 3 shows a front view of component 100, FIG. 4 shows a back view of component 100, and FIG. 5 shows a side of component 100. As discussed herein, component 100 may be positioned, held, and/or secured within a fixture when performing manufacturing processes on component 100. Additionally, component 100 shown in FIGS. 1-5 may be any number of components, parts of an assembly or system, manufacturing device, and/or apparatus that may undergo various manufacturing processes and/or procedures. For example, component 100 may be a core die that may be utilized in casting and/or molding processes. In another non-limiting example, component 100 may be a mold used in casting and/or molding processes. In a further non-limiting example, component 100 may be an unfinished turbine blade or portion of a turbine blade that may require additional processing. In the non-limiting examples, and as discussed herein, component 100 may be positioned, held, and/or secured within a fixture (see, FIGS. 6-11) to provide support and/or substantially prevent movement of component 100 when performing manufacturing processes on component 100. The manufacturing processes performed on component 100 while positioned, held, and/or secured within a fixture may include, but are not limited to machining, firing, filling, coating, joining, casting, and the like.

As shown in FIGS. 1-5, component 100 may include a body 102 and various surfaces, sides, and/or ends. Specifically, body 102 of component 100 may include a first surface 104 (see, FIGS. 1 and 3-5), and a second surface 106 (see, FIGS. 2-5) positioned opposite first surface 104. As shown in FIGS. 1 and 2, body 102 of component 100 may also include two opposing sides 108, 110 positioned between first surface 104 and second surface 106. Additionally, and as shown in FIGS. 1 and 2, body 102 of component 100 may include two opposing ends 112, 118 positioned between first surface 104 and second surface 106, and opposing sides 108, 110, respectively.

As shown in FIGS. 1-5, component 100 may also include a plurality of removable features 120. The plurality of removable features 120 may be formed on various portions of component 100. In a non-limiting example, the plurality of removable features 120 be formed on first surface 104 and second surface 106 of component 100. The plurality of removable features 120 may also be formed on component 100 adjacent opposing ends 112, 118, and between opposing sides 108, 110. As discussed herein, the "removable features" may make reference to a temporary, auxiliary, and/or supplemental structure or feature added or built (e.g., additively manufactured) on component 100 to at least partially aid in securing component 100 within the fixture. Additionally, and as discussed herein, the "removable features" may also be removed from component 100 after component 100 no longer needs to be secured and/or positioned within the fixture and/or when manufacturing processes no longer need to be performed on component 100.

Additionally in the non-limiting example shown in FIGS. 1-5, the plurality of removable features 120 may be formed and/or may have a hemispherical or ellipsoidal shape. In other non-limiting examples discussed herein (see, FIGS. 19-21) the plurality of removable features 120 may be formed from other shapes including, but not limited to, cones, pyramids, cubic/cuboid shapes, and other simple or basic shapes. The shape of the plurality of removable features 120, along with a shape of the supports of the fixture, may aid in positioning, holding, and/or securing component 100 within the fixture (see, FIGS. 6-11), as discussed herein. Furthermore, the shape of the plurality of removable features 120, along with a shape of the supports of the fixture receiving the plurality of removable features 120, may allow a single fixture to hold a variety of components 100 including distinct geometries/shapes and distinct shapes for the plurality of removable features 120 formed on each component 100, as discussed herein. Additionally, or alternatively, and depending on the shape of the supports of the fixture, the shape of the plurality of removable features 120 may aid in allowing component 100 to move while being positioned within the fixture, as discussed herein.

As shown in FIGS. 1-5, the plurality of removable features 120 may include four groups 122, 124, 126, 128 of removable features 120. Specifically, the plurality of removable features 120 may include a first group 120 of removable features 120 (see, FIGS. 1, 3, and 5) formed on first surface 104 of component 100, adjacent end 112; and a second group 124 of removable features 120 formed on first surface 104, adjacent end 118 (see, FIGS. 1, 4, and 5). Additionally, the plurality of removable features 120 may include a third group 126 of removable features 120 (see, FIGS. 2, 3, and 5) formed on second surface 106 of component 100, adjacent end 112; and a fourth group 128 of removable features 120 formed on second surface 106, adjacent end 118 (see, FIGS. 2, 4, and 5). In the non-limiting example, third group 126 of removable features 120 formed on second surface 106 may be substantially opposite and/or aligned with first group 120 of removable features 120 formed on first surface 104, and fourth group 128 of removable features 120 formed on second surface 106 may be substantially opposite and/or aligned with second group 124 of removable features 120 formed on first surface 104.

The position and/or placement of the plurality of removable features 120 on component 100 may be dependent, at least in part, on the shape of component 100, the size of component 100, elements or structures of component 100, and the like. For example, first group 120 of removable features 120 and third group 126 of removable features 120 may be formed adjacent end 112, and substantially opposite and/or aligned from one another, as a result of the portion of component 100 adjacent end 112 having a hollowed body. The hollowed body may require additional support when positioned within the fixture and/or when performing manufacturing processes on component 100 positioned, held, and/or secured within the fixture. As a result, first group 120 of removable features 120 and third group 126 of removable features 120 may be formed on the portion of component 100 including the hollowed body. Additionally, or alternatively, the position and/or placement of the plurality of removable features 120 on component 100 may be dependent, at least in part, on the position and/or number of supports included within the fixture, as discussed herein.

The plurality of removable features 120 may be formed on component 100 using any suitable manufacturing process appropriate for the material of component 100. For example, the plurality of removable features 120 may be formed during a casting or machining process that forms component 100. In another non-limiting example, the plurality of removable features 120 may be joined (e.g., coupled, affixed, and the like) to component 100 after component 100 is formed in preceding manufacturing processes. In further non-limiting examples, the plurality of removable features 120 may be formed on component 100 using additive manufacturing. In this non-limiting example, component 100 may be previously formed using any suitable manufacturing processes. Once formed, the plurality of removable features 120 may be additively manufactured on component 100 in the predetermined positions using any suitable additive manufacturing process including, but not limited to: direct metal laser sintering (DMLS), selective laser melting (SLM), stereolithography, fused deposit modeling, 3-D printing, and the like.

Additionally, the plurality of removable features 120 formed on component 100 may be formed from any suitable material that may aid in the positioning, holding, and/or securing component 100 within the fixture, as discussed herein. Furthermore, the plurality of removable features 120 formed on component 100 may be formed from any suitable material that may allow for the plurality of removable features 120 to be removed from component 100 without altering the structure of component 100. That is, the plurality of removable features 120 may be formed from any suitable material that allows the plurality of removable features 120 to be removed from component 100 after performing the manufacturing process(es) on component 100 positioned, held, and/or secured within the fixture, as discussed herein. The plurality of removable features 120 may also be formed from any suitable material that may withstand the material, chemical, and/or mechanical stress/strain experienced by component 100 when performing the manufacturing process(es) on component 100 positioned, held, and/or secured within the fixture. For example, where component 100 may undergo a firing process once positioned, held, and/or secured within the fixture, the plurality of removable features 120 may be formed from a material that may withstand exposure to high temperatures. In non-limiting examples, the plurality of removable features 120 may be formed from metal, metal alloys, polymers, ceramics, and other materials having similar material, chemical, and/or mechanical properties as component 100.

Although shown as four distinct groups 122, 124, 126, 128 of removable features 120 in FIGS. 1-5, it is understood that the number of groups 122, 124, 126, 128 of removable features formed on component 100 is illustrative and non-limiting. As such, component 100 may include more or less groups 122, 124, 126, 128 of removable features 120 than those shown in FIGS. 1-5 (see, FIG. 21). Additionally in the non-limiting example shown in FIGS. 1-5, each group 122, 124, 126, 128 of removable features 120 includes two removable features 120. However, the number of removable features 120 included within each group 122, 124, 126, 128 of removable features 120 is illustrative and non-limiting. It is understood that each group 122, 124, 126, 128 of removable features 120 may include more or less movable features 120 than the number shown in FIGS. 1-5 (see, FIG. 21).

Figure 6:
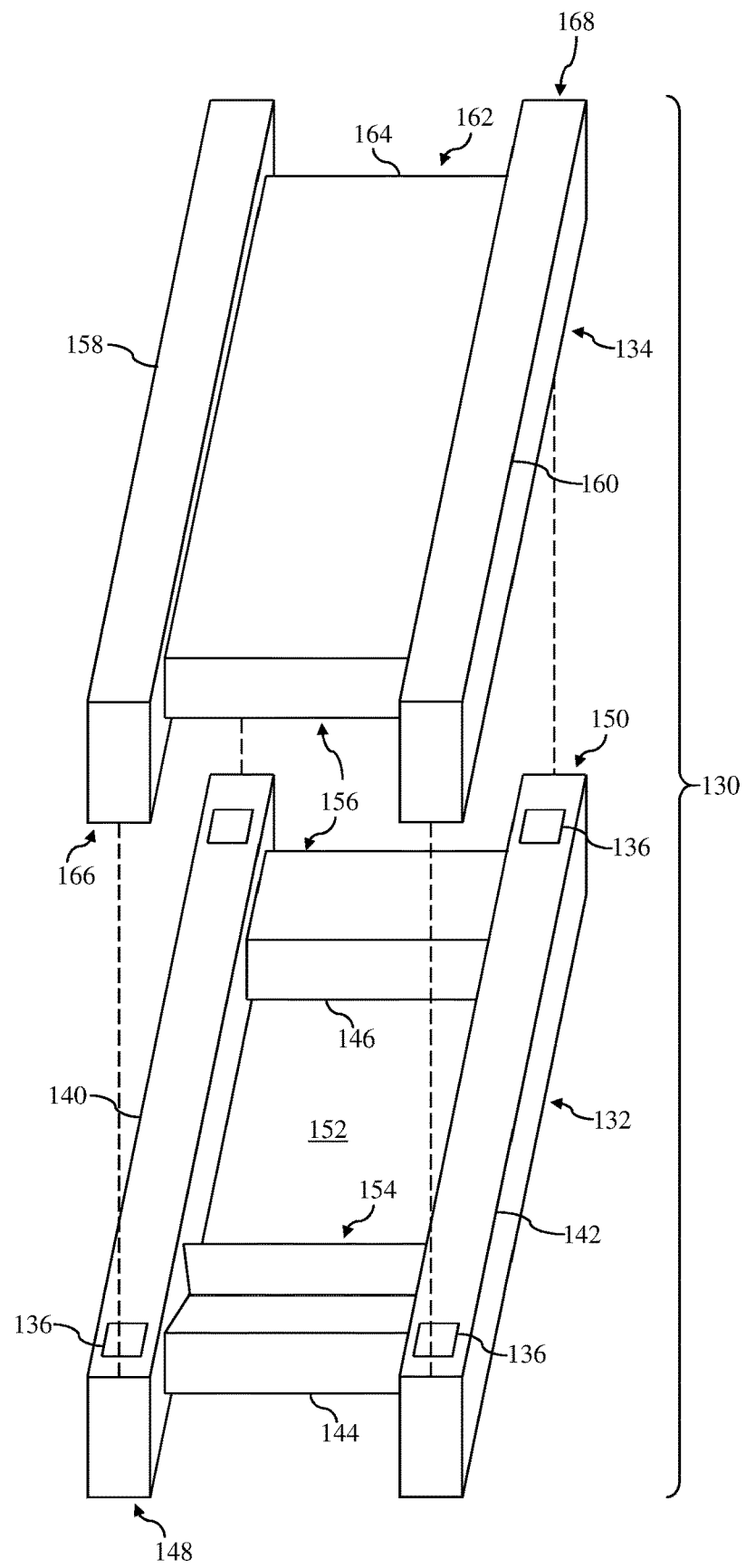
FIG. 6 shows an exploded, isometric view of a fixture for holding a component, according to embodiments of the disclosure.
Figure 7:
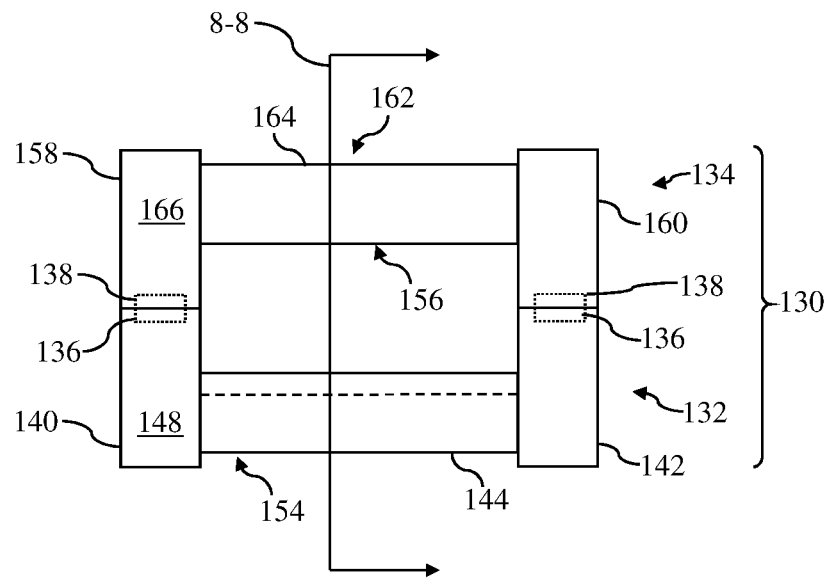
FIG. 7 shows a front view of the fixture of FIG. 6 including a component positioned therein, according to embodiments of the disclosure.
Figure 8:
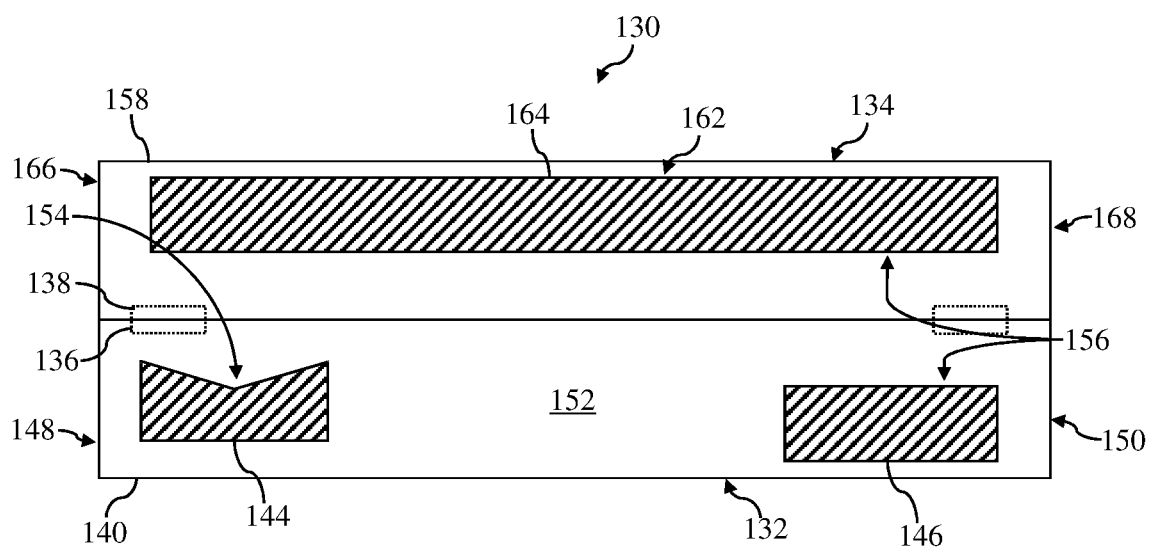
FIG. 8 shows a side, cross-sectional view of the fixture and the component taken along line 8-8 in FIG. 7, according to embodiments of the disclosure.

FIGS. 6-8 show various views of fixture 130 configured to receive, hold, and/or secure component 100 therein. Specifically, FIG. 6 shows an exploded isometric view of fixture 130, FIG. 7 shows a front view of fixture 130, and FIG. 8 shows a side, cross-sectional view of fixture 130 taken along line 8-8 in FIG. 7.

In non-limiting example shown in FIGS. 6-8, fixture 130 may include two, distinct members 132, 134. Specifically, fixture 130 may include a first member 132 and second member 134. The two members 132, 134 forming fixture 130 may be positioned opposite one another. That is, and as shown in FIGS. 6-8, second member 134 may be positioned opposite first member 132, and second member 134 may also contact and/or be configured to contact first member 132 (see, FIGS. 7 and 8) when positioning component 100 within fixture 130. Additionally, second member 134 may also be substantially vertically and/or horizontally aligned with first member 132. In a non-limiting example, second member 134 of fixture 130 may also be releasably coupled to first member 132 when positioning and/or holding component 100 within fixture 130. Second member 134 may be releasably coupled to first member 132 of fixture 130 using any suitable coupling mechanism and/or technique for coupling two components. For example, and as shown in FIGS. 6-8, each of first member 132 and second member 134 (see, FIGS. 7 and 8) may include a plurality of magnets 136, 138 formed therein. Magnets 136 of first member 132 may be positioned substantially opposite and may engage magnets 138 of second member 134 to releasably couple first member 132 and second member 134. Magnets 136, 138 used to couple first member 132 and second member 134 may also aid in aligning first member 132 and second member 134 when positioning, holding, and/or securing component 100 within fixture 130, as discussed herein. Although discussed herein as utilizing magnets 136, 138 for coupling first member 132 and second member 134, it is understood that other suitable coupling mechanism and/or techniques may be used to couple first member 132 and second member 134. First member 132 and second member 134 may be sized, shaped, and/or configured based on the various features, parts, and/or components included within the two members 132, 134 that may aid in positioning, holding, and/or securing component 100 within fixture 130. Additionally, or alternatively, first member 132 and second member 134 may be sized, shaped, and/or configured based on the size, shape, and/or configuration of the variety of components (e.g., component 100) that fixture 130 may hold and/or secure within.

Each of first member 132 and second member 134 forming fixture 130 may include various features, parts, and/or components that may aid in positioning, holding, and/or securing component 100 within fixture 130. For example, first member 132 of fixture 130 may include opposing side rails 140, 142 and at least two supports 144, 146. As discussed herein, two supports 144, 146 of first member 132 may contact and/or receive the plurality of removable features 120 formed on first surface 104 of component 100. Additionally, and as shown in the non-limiting example of FIGS. 6-8, opposing side rails 140, 142 may be coupled to each of two supports 144, 146, and/or two supports 144, 146 may extend between opposing side rails 140, 142. In a non-limiting example, the two supports 144, 146 may extend substantially parallel to one another, and substantially perpendicular to each opposing side rail 140, 142. Additionally, opposing side rails 140, 142 may extend substantially parallel to one another. As such, opposing side rails 140, 142 coupled to two supports 144, 146 may provide structure to two supports 144, 146, and/or may allow for first member 132 to be formed as a substantially rigid, unibody component. Opposing side rails 140, 142 may also include magnets 136 for first member 132, and may contact and/or be releasably coupled to a portion (e.g., opposing side rails) of second member 132, as discussed herein. In the non-limiting example shown in FIGS. 6-8, opposing side rails 140, 142 and two supports 144, 146 may be formed as distinct parts and may be coupled, joined, and/or affixed using any suitable coupling and/or joining components or techniques. In other non-limiting examples, opposing side rails 140, 142 and two supports 144, 146 of first member 132 may be integrally formed as a single piece, part and/or component.

Opposing side rails 140, 142 and two supports 144, 146 of first member 132 may be formed from any suitable material that may support, hold, and/or secure component 100 within fixture 130 while performing the manufacturing process(es) on component 100, as discussed herein. Additionally, opposing side rails 140, 142 and two supports 144, 146 may be formed from any suitable material that may allow a user (e.g., machinist) or system (e.g., computer numerical control (CNC) system) to handle fixture 130 when performing manufacturing process(es) on component 100 positioned, held, and/or secured within fixture 130. Opposing side rails 140, 142 and two supports 144, 146 may also be formed from any suitable material that may withstand the material, chemical, and/or mechanical stress/strain experienced when performing the manufacturing process(es) on component 100 positioned, held, and/or secured within fixture 130. For example, opposing side rails 140, 142 and two supports 144, 146 of first member 132 may be formed from a material that may withstand vibrations experienced by first member 132 when performing a machining process (e.g., drilling, milling, grinding, blasting, and so on) on component 100 positioned within fixture 130. In non-limiting examples, opposing side rails 140, 142 and two supports 144, 146 of first member 132 may be formed from metal, metal alloys, polymers, ceramics, and other materials having similar material, chemical, and/or mechanical properties.

In the non-limiting examples shown in FIGS. 6-8, the at least two supports 144, 146 of first member 132 may include a first support 144 and a second support 146. As discussed herein, first support 144 may extend between and/or be coupled to opposing side rails 140, 142 of first member 132. First support 144 may also be positioned and/or formed adjacent a first end 148 of first member 132. Similar to first support 144, second support 146 may also extend between and/or be coupled to opposing side rails 140, 142 of first member 132. Additionally, second support 146 may be positioned adjacent and/or opposite first support 144, and may be positioned adjacent a second end 150 of first member 132. Second end 150 of first member 132 may be positioned opposite first end 148. As shown in the non-limiting example of FIGS. 6-8, second support 146 may be formed separate from and, may be separated from first support 144 within first member 132. As a result of second support 146 being formed separate and/or separated from first support 144, first member 132 may also include at least one opening 152. Opening 152 of first member 132 may be formed between opposing side rails 140, 142, and first support 144 and second support 146, respectively. Opening 152 formed in first member 132 of fixture 130 may provide access to at least a portion of component 100 through first member 132 of fixture 130. Providing access to at least a portion of component 100 via opening 152 may allow a user (e.g., machinist) or system (e.g., computer numerical control (CNC) system) to perform manufacturing process(es) on component 100 while positioned, held, and/or secured within fixture 130, as discussed herein.

Figure 9:
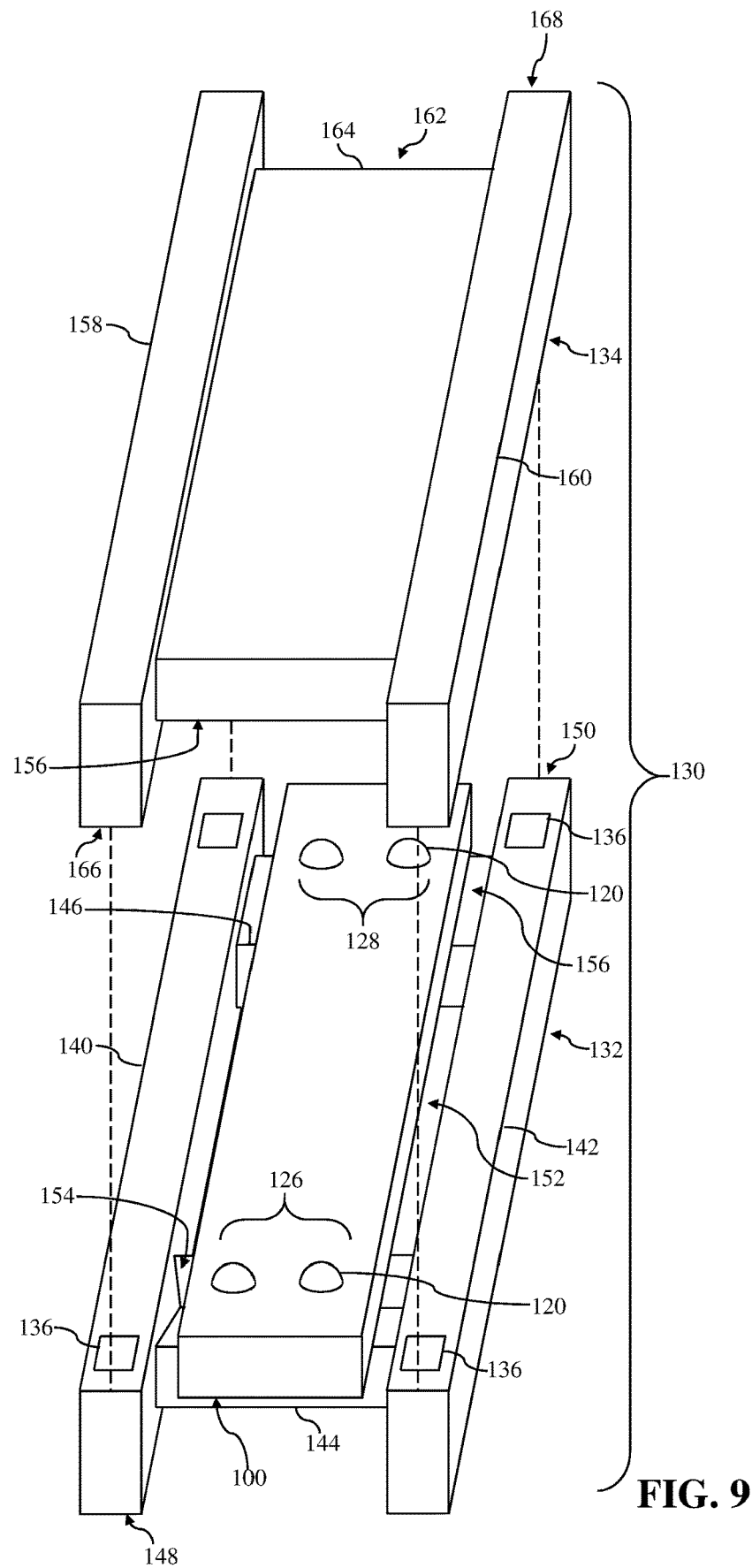
FIG. 9 shows a partially exploded isometric view of the component of FIGS. 1-5 positioned within the fixture of FIGS. 6-8, according to embodiments of the disclosure.
Figure 10:
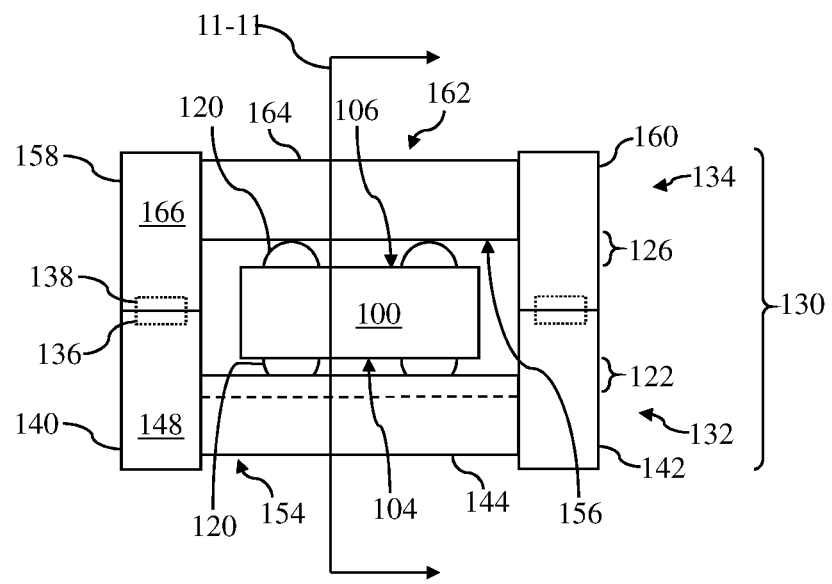
FIG. 10 shows a front view of the component positioned within the fixture, according to embodiments of the disclosure.
Figure 11:
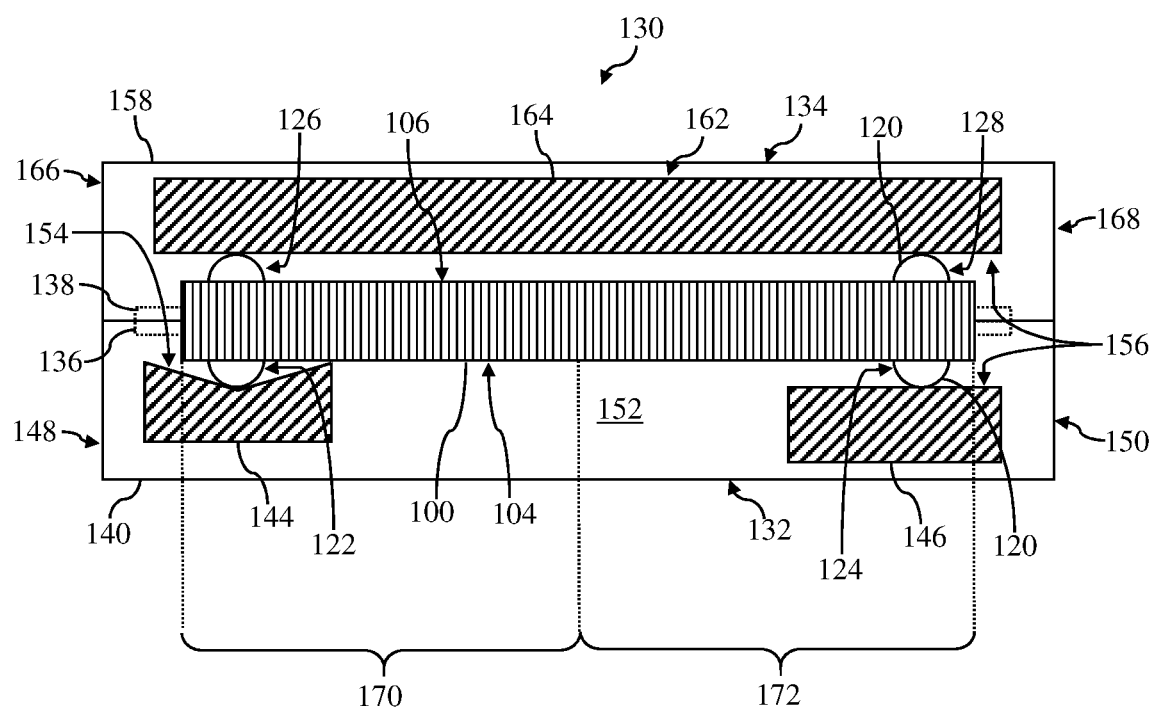
FIG. 11 shows a side, cross-sectional view of the component positioned within the fixture taken along line 11-11 in FIG. 10, according to embodiments of the disclosure.

In the non-limiting example, first support 144 may be configured to contact and/or receive first group 120 of removable features 120 formed on first surface 104 of component 100, and second support 146 may be configured to contact and/or receive second group 124 of removable features 120 formed on first surface 104 of component 100 (see, FIGS. 9-11). First support 144 and second support 146 of first member 132 for fixture 130 may also include, be formed with, and/or have a predetermined shape. The shape of first support 144 and second support 146 may determine or define a specific interaction first support 144 and second support 146 may have with the corresponding groups 122, 124 of removable features 120 of component 100. That is, the shape of first support 144 may determine or define a specific interaction first support 144 has with first group 122 of removable features 120 formed on component 100. The shape of second support 146 may determine or define a specific interaction second support 146 has with second group 124 of removable features 120 formed on component 100. In the non-limiting example shown in FIGS. 6-8, first support 144 may have a first shape 154, while second support 146 may have a second shape 156, distinct from first shape 154. In the non-limiting example, first shape 154 may be a substantially concave shape, and more specifically a "v-shaped" surface, that may contact, receive, and substantially secure first group 120 of removable features 120 within first support 144. Additionally, because first shape 154 of first support 144 substantially secures first group 120 of removable features 120 within first support 144, first shape 154 may also substantially prevent movement (e.g., expansion/growth, contraction/shrinkage) of at least a portion of component 100 within fixture 130, as discussed herein.

Additionally in the non-limiting example of FIGS. 6-8, second shape 156 may be a substantially linear, planar, and/or flat surface. Second support 146 having second shape 156 may contact and/or receive second group 124 of removable features 120. Distinct from first shape 154, second shape 156 may not substantially secure second group 124 of removable features 120 within second support 146, but rather may allow second group 124 of removable features 120 to move or slide over second support 146. As a result of second shape 156 allowing second group 124 of removable features 120 to move over second support 146, second shape 156 may also allow movement of at least a portion of component 100 within fixture 130 (e.g., expansion/growth, contraction/shrinkage), as discussed herein.

Similar to first member 132, second member 134 of fixture 130 may include opposing side rails 158, 160 and at least one support 162. As discussed herein, support 162 of second member 134 may contact and/or receive the plurality of removable features 120 formed on second surface 106 of component 100. Additionally, and as shown in the non-limiting example of FIGS. 6-8, opposing side rails 158, 160 may be coupled to support 162, and/or support 162 may extend between opposing side rails 158, 160. In a non-limiting example, support 162 may extend substantially perpendicular to each opposing side rail 158, 160. Opposing side rails 158, 160 may extend substantially parallel to one another. As such, opposing side rails 158, 160 coupled to support 162 may provide structure to support 162, and/or may allow for second member 134 to be formed as a substantially rigid, unibody component. Opposing side rails 158, 160 may also include magnets 138 for second member 134, and may be releasably coupled to corresponding magnets 136 of first member 132. That is, opposing side rails 158, 160 of second member 134 may contact and/or be positioned on opposing side rails 140, 142 of first member 132, and magnets 138 of second member 134 may be aligned with, releasably coupled, and/or magnetically attracted to magnets 136 of first member 132 to releasably couple second member 134 to first member 132. Similar to first member 132, opposing side rails 158, 160 and support 162 may be formed as distinct parts and may be coupled, joined, and/or affixed using any suitable coupling and/or joining components or techniques. In other non-limiting examples, opposing side rails 158, 160 and support 162 of second member 134 may be integrally formed as a single piece, part and/or component. Opposing side rails 158, 160 and support 162 of second member 134 may be formed from any suitable material similar to first member 132. Redundant explanation of the material forming second member 134 is omitted herein for brevity.

In the non-limiting examples shown in FIGS. 6-8, the at least one support 162 of second member 134 may include a third support 164. Third support 164 may extend between and/or be coupled to opposing side rails 158, 160 of second member 134. Also in the non-limiting example, third support 164 may extend substantially between opposing ends 166, 168 of second member 134. Third support 164 extending substantially between opposing ends 166, 168 of second member 134 may also be positioned opposite first support 144 of first member 132, and second support 146 of first member 132, respectively. As shown in the non-limiting example of FIGS. 6-8, when second member 134 is releasably coupled to first member 132, third support 164 may be positioned substantially opposite, substantially aligned with, and/or may substantially span over both first support 144 and second support 146 of first member 132.

In the non-limiting example, and as discussed herein, second support 164 may be configured to contact and/or receive third group 126 of removable features 120 formed on second surface 106 of component 100 (see, FIGS. 9-11). Additionally, second support 164 may be sized and configured to contact and/or receive fourth group 128 of removable features 120 formed on second surface 106 of component 100 (see, FIGS. 9-11). Similar to first support 144 and second support 146 of first member 132, third support 164 of second member 134 may include, be formed with, and/or have a predetermined shape that determines or defines a specific interaction third support 164 may have with the corresponding groups 126, 128 of removable features 120 of component 100. That is, the shape of third support 164 may determine or define a specific interaction third support 164 has with third group 126 of removable features 120 and fourth group 128 of removable features 120 formed on component 100. In the non-limiting example shown in FIGS. 6-8, first support 144 may have a first shape 154, while second support 146 may have a second shape 156, distinct from first shape 154. In the non-limiting example, third support 164 may have second shape 156 that may be substantially linear, planar, and/or flat, as discussed herein. Third support 164 having second shape 156 may contact and/or receive third group 126 of removable features 120, and fourth group 128 of removable features 120, and may allow the groups 126, 128 of removable features 120 to move or slide over third support 164. As similarly discussed herein, second shape 156 of third support 164 may allow third group 126 of removable features 120, and fourth group 128 of removable features 120 to move over third support 164, and ultimately may allow movement of at least a portion of component 100 within fixture 130, as discussed herein. In other non-limiting examples (see, FIGS. 16 and 17) third support 164 may include, be formed with, and/or have first shape 154.

FIGS. 9-11 show various views of component 100 positioned within and/or held by fixture 130. That is, FIG. 9 shows a partially exploded isometric view of component 100 positioned within fixture 130, FIG. 10 shows a front view of component 100 positioned within fixture 130, and FIG. 11 shows a side, cross-sectional view of component and fixture 130 taken along line 11-11 in FIG. 10. It is understood that similarly numbered and/or named components may function in a substantially similar fashion. Redundant explanation of these components has been omitted for clarity.

As shown in FIGS. 9-11, component 100 may be positioned, held, and/or secured within fixture 130 in order to perform manufacturing processes on component 100. That is, component 100 may be positioned, held, and/or secured within fixture 130 when second member 134 is releasably coupled to first member 132 (see, FIGS. 10 and 11). When positioned within fixture 130, component 100 may be positioned between opposing side rails 140, 142 of first member 132 and opposing side rails 158, 160 of second member 134. In the non-limiting example, first surface 104 of component 100 may be positioned adjacent first support 144 and second support 146 of first member 132. Additionally, second surface 106 of component 100 may be positioned adjacent third support 164 of second member 134, when component 100 is positioned within fixture 130.

As discussed herein, the various groups 122, 124, 126, 128 of removable features 120 may contact and/or be received by corresponding supports 144, 146, 164 of fixture 130. For example, first support 144 of first member 132 for fixture 130 may contact and/or receive first group 122 of removable features 120 formed on first surface 104 of component 100. Specifically, first group 122 of removable features 120 formed on first surface 104 of component 100 may contact and/or be received by first support 144 of first member 132 having first shape 154. In the non-limiting example, first shape 154 may include a concave shape, and more specifically a "v-shaped" surface (see, FIGS. 9 and 11). As shown in FIG. 11, first group 122 of removable features 120 of component 100 may sit, lie, and/or be secured by first support 144 having first shape 154. That is, first shape 154 ("v-shaped" surface), along with the shape of removable features 120 of first group 122 (e.g., hemispherical), may substantially prevent first group 122 of removable features 120 from moving once first group 122 of removable features 120 is positioned within first support 144, and second member 134 is subsequently coupled to first member 132. As a result, at least a portion 170 of component 100 that is substantially aligned with and/or extends adjacent to first support 144 may be prevented from moving within fixture 130.

Also shown in FIGS. 9 and 11, second support 146 of first member 132 may contact and/or receive second group 124 of removable features 120 formed on first surface 104 of component 100. Specifically, second group 124 of removable features 120 formed on first surface 104 of component 100 may contact and/or be received by second support 146 of first member 132 having second shape 156. In the non-limiting example, second shape 156 may include a substantially linear, planar, and/or flat surface (see, FIGS. 9 and 11). As shown in FIG. 11, second group 124 of removable features 120 of component 100 may sit, and/or be supported by second support 146 having second shape 156. Second shape 156, along with the shape of removable features 120 of second group 124 (e.g., hemispherical), may substantially allow first group 122 of removable features 120 and at least a portion 172 of component 100 to move within fixture 130.

For example, if fixture 130 is used to position, hold, and/or secure component 100 during a firing process, at least a portion of component 100 may subsequently shrink after the firing process. By positioning second group 124 of removable features 120 on second support 146 having second shape 156, portion 172 of component 100 that may be substantially aligned with and/or extends adjacent to second support 146 may move toward first group 122 of removable features 120/first support 144 when shrinking. Portion 172 may move toward first group 122 of removable features 120/first support 144 as a result of the substantially linear, planar, and/or flat surface of second support 146 (e.g., second shape 156), and/or the hemispherical shape of removable features 120 of second group 124. Additionally, and as discussed herein, portion 170 of component 100 may remain fixed and/or may not move during the shrinking process as a result of first support 144 having first shape 154.

Additionally, third support 164 of second member 134 may also contact and/or receive distinct groups 126, 128 of removable features 120 formed on component 100. Specifically, third group 126 of removable features 120 formed on second surface 106 of component 100 may contact and/or be received by third support 164 of second member 134. Third support 164 of second member 134 may also contact and/or receive fourth group 128 of removable features 120 formed on second surface 106 of component 100 when second member 134 is coupled to first member 132 to position and/or secure component 100 within fixture 130. When second member 134 is coupled to first member 132, third support 164 may contact and apply a force on groups 126, 128 of removable features 120 for securing component 100 within fixture 130 and/or preventing component 100 from being able to move in a direction toward second member 134. Additionally, the force applied to groups 126, 128 of removable features 120 by third support 164 may prevent component 100 from being able to move in directions toward and/or between opposing side rails 140, 142, 158, 160 for first member 132 and second member 134, respectively.

Similar to second support 146 of first member 132, third support 164 of second member 134 may have second shape 156. Second shape 156, along with the shape of removable features 120 of third group 126 and fourth group 128 (e.g., hemispherical), may substantially allow component 100 to move within fixture 130. Continuing the example above, because fourth group 128 of removable features 120 contacts third support 164 having second shape 156, portion 172 of component 100 may move toward first support 144/end 166 of second member 134 when shrinking. Like the second support 146, portion 172 may move toward first support 144/end 166 of second member 134 as a result of the substantially linear, planar, and/or flat surface of third support 164 (e.g., second shape 156), and/or the hemispherical shape of removable features 120 of fourth group 128. Although third group 126 of removable features 120 also contacts third support 164 having second shape 156, portion 170 of component 100 may remain fixed and/or may not move during the shrinking process. Specifically, and as discussed herein, portion 170 of component 100 may remain fixed and/or may not move during the shrinking process as a result of first support 144 having first shape 154.

Figure 12:
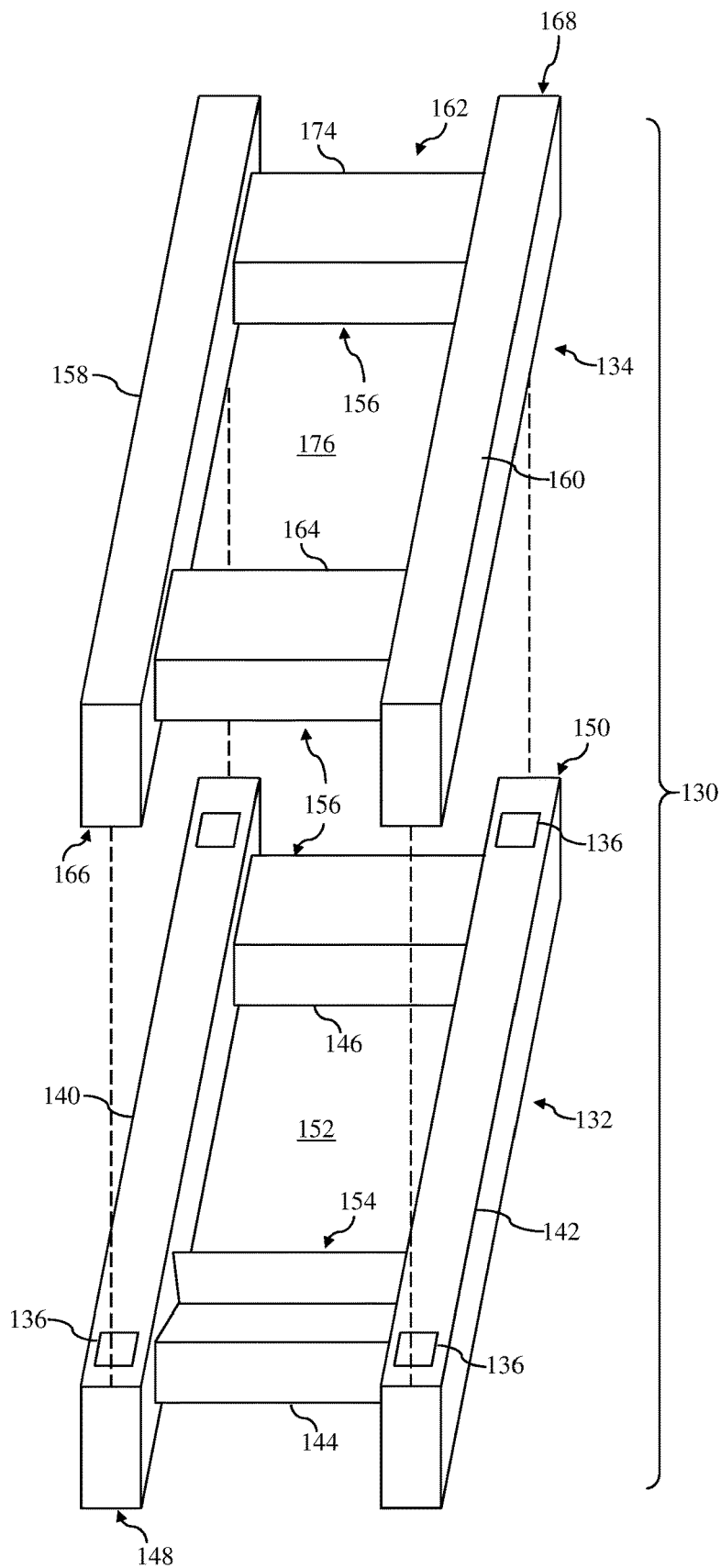
FIG. 12 shows an exploded, isometric view of a fixture for holding a component, according to additional embodiments of the disclosure.
Figure 13:
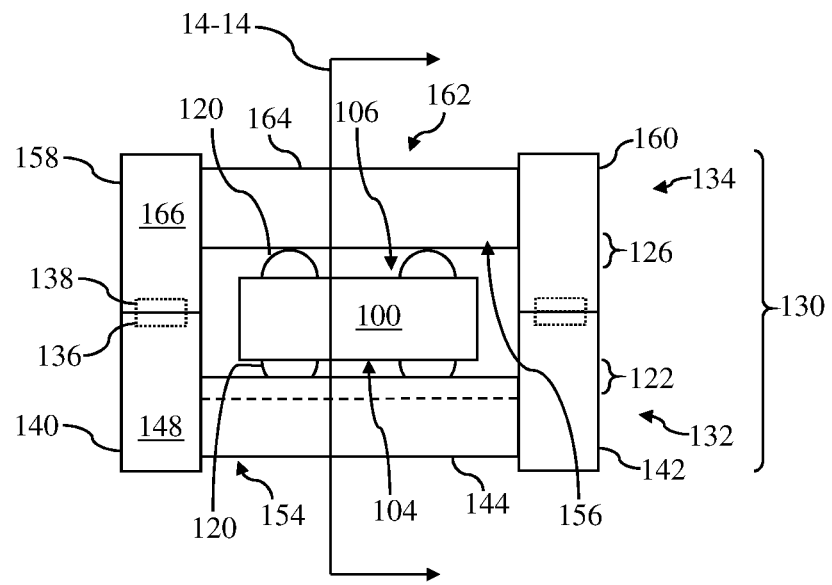
FIG. 13 shows a front view of the component of FIGS. 1-5 positioned within the fixture of FIG. 12, according to embodiments of the disclosure.
Figure 14:
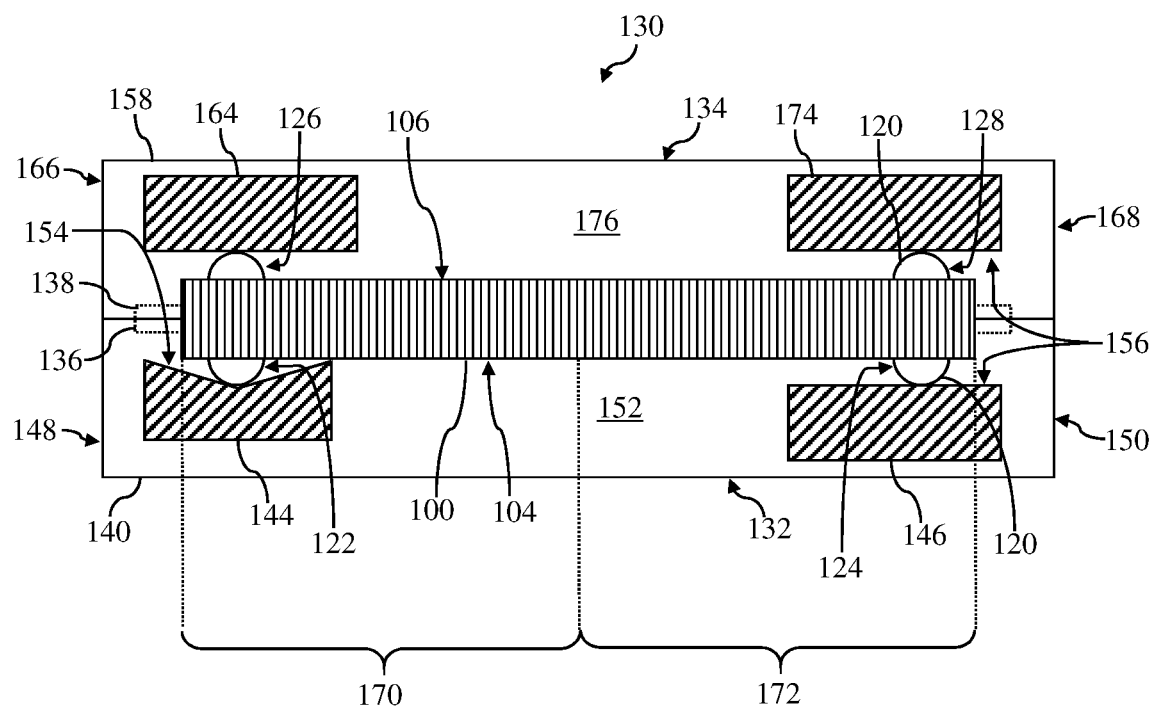
FIG. 14 shows a side, cross-sectional view of the component of FIGS. 1-5 positioned within the fixture taken along line 14-14 in FIG. 13, according to embodiments of the disclosure.

FIGS. 12-14 show various views of another non-limiting example of fixture 130. Specifically, FIG. 12 shows an exploded isometric view of fixture 130, FIG. 13 shows a front view of component 100 positioned within fixture 130 of FIG. 12, and FIG. 14 shows a side, cross-sectional view of component 100 and fixture 130 taken along line 14-14 in FIG. 13. It is understood that similarly numbered and/or named components may function in a substantially similar fashion. Redundant explanation of these components has been omitted for clarity.

With comparison to FIGS. 9-11, the non-limiting example of fixture 130 shown in FIGS. 12-14 may include similar and distinct features and/or components. For example, first member 132 of fixture 130 shown in FIGS. 12-14 may be substantially similar to first member 132 shown and discussed herein with respect to FIGS. 9-11. However, second member 134 of fixture 130 shown in FIGS. 12-14 may include distinct features, components and/or configurations from second member 134 shown and discussed herein with respect to FIGS. 9-11.

As shown in the non-limiting example of FIGS. 12-14, the at least one support 162 of second member 134 may include third support 164. Third support 164 may extend between and/or be coupled to opposing side rails 158, 160 of second member 134. Also in the non-limiting example shown in FIGS. 12-14, third support 164 may be positioned and/or formed adjacent first end 166 of second member 134. Third support 164 extending substantially adjacent first end 166 may also be positioned opposite first support 144 of first member 132. That is, when second member 134 is releasably coupled to first member 132, third support 164 may be positioned substantially opposite, substantially aligned with, and/or may substantially span over first support 144 of first member 132. In the non-limiting example, and as discussed herein, second support 164 may be configured to contact and/or receive only third group 126 of removable features 120 formed on second surface 106 of component 100 (see, FIGS. 13 and 14). Additionally, and similar to third support 164 of FIGS. 9-11, third support 164 of second member 134 shown in FIGS. 12-14 may have second shape 156.

Additionally distinct from the non-limiting example of second member 134 shown and discussed herein with respect to FIGS. 9-11, the at least one support 162 of second member 134 shown in FIGS. 12 and 14 may also include fourth support 174. Fourth support 174 may extend between and/or be coupled to opposing side rails 158, 160 of second member 134. Also in the non-limiting example shown in FIGS. 12 and 14, fourth support 174 may be positioned and/or formed adjacent second end 168 of second member 134, and may be positioned adjacent and/or opposite third support 164. Additionally, and similar to supports 144, 146 of first member 132, the two supports 164, 174 of second member 134 may extend substantially parallel to one another, and substantially perpendicular to each opposing side rail 158, 160. As shown in the non-limiting example of FIGS. 12 and 14, fourth support 174 may be formed separate from and, may be separated from third support 164 within second member 134. As a result of fourth support 174 being formed separate and/or separated from third support 164, second member 134 may also include opening 176. Opening 176 of second member 134 may be formed between opposing side rails 158, 160, and third support 164 and fourth support 174, respectively. Similar to opening 152 formed in first member 132, opening 176 formed in second member 134 of fixture 130 may provide access to at least a portion of component 100 through second member 134 of fixture 130.

In the non-limiting example shown in FIGS. 12-14, third support 164 of second member 134 may contact and/or receive third groups 126 of removable features 120 formed on component 100. Specifically, third group 126 of removable features 120 formed on second surface 106 of component 100 may contact and/or be received by third support 164 of second member 134. Additionally, fourth support 174 of second member 134 may contact and/or receive fourth group 128 of removable features 120 formed on second surface 106 of component 100 when second member 134 is coupled to first member 132 to position and/or secure component 100 within fixture 130. As shown in FIG. 14, third support 164 and fourth support 174 of second member 134 may have second shape 156. Similar to the example discussed herein with respect to FIGS. 9-11, because fourth group 128 of removable features 120 contacts fourth support 174 having second shape 156, portion 172 of component 100 may move toward first support 144/end 166 of second member 134 when shrinking. Like the second support 146, portion 172 may move toward first support 144/end 166 of second member 134 as a result of the substantially linear, planar, and/or flat surface of fourth support 174 (e.g., second shape 156), and/or the hemispherical shape of removable features 120 of fourth group 128. Although third group 126 of removable features 120 contacts third support 164 having second shape 156, portion 170 of component 100 may remain fixed and/or may not move as a result of first support 144 having first shape 154, as discussed herein.

Figure 15:
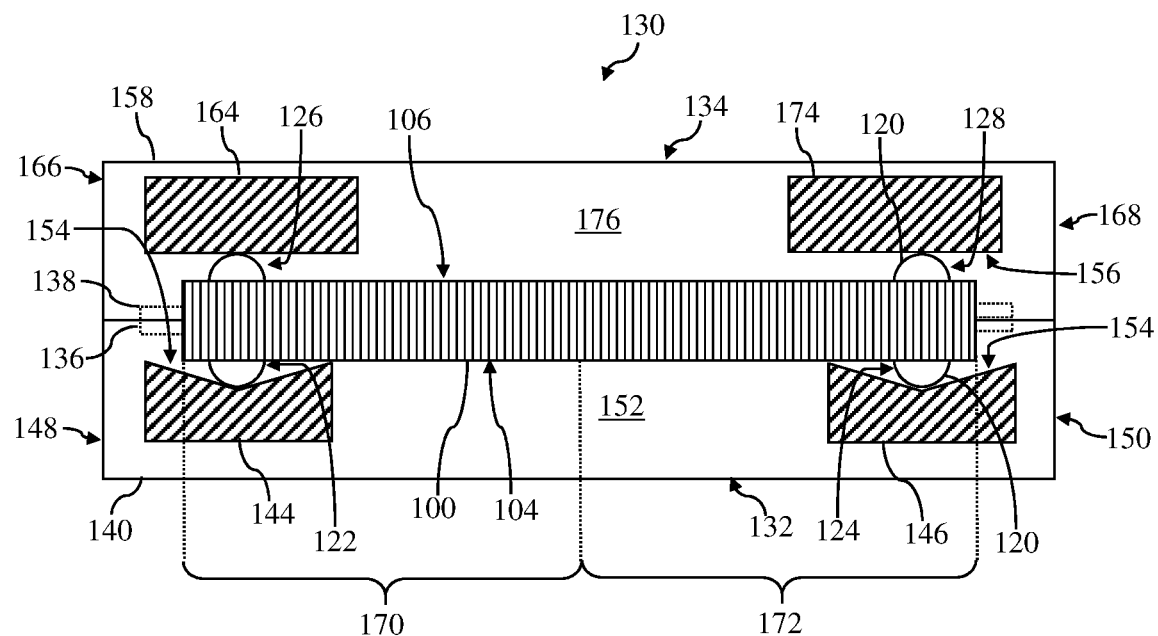
FIGS. 15-17 show side, cross-sectional views of the component of FIGS. 1-5 positioned within the fixture taken along line 14-14 in FIG. 13, according to additional embodiments of the disclosure.
Figure 16:
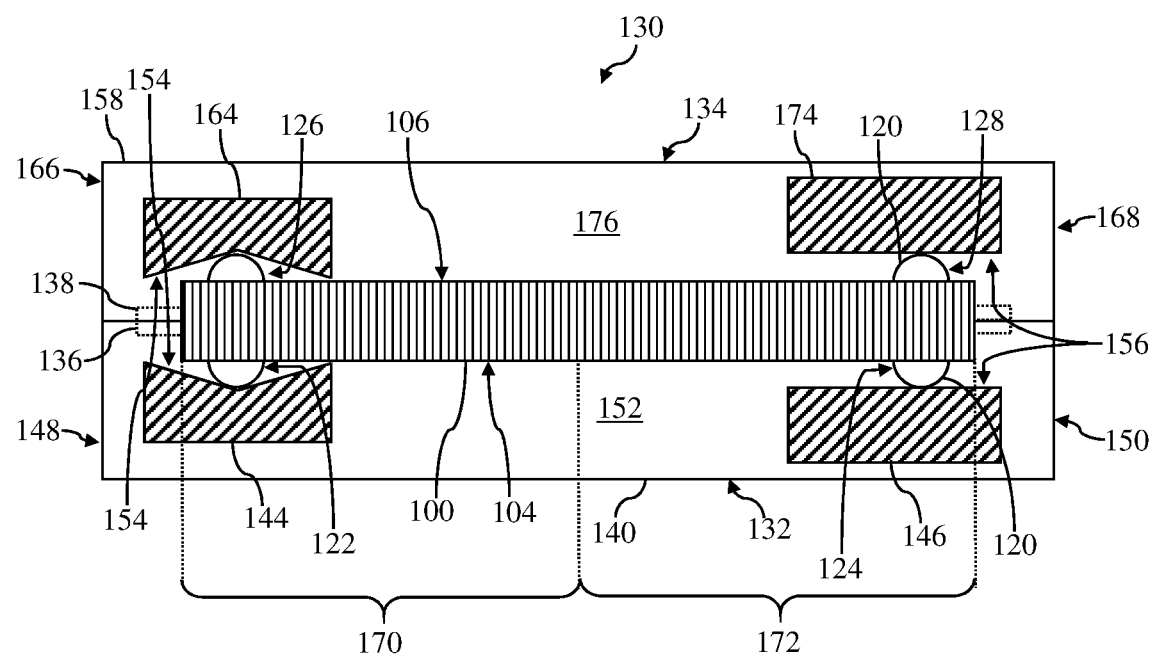
Figure 17:
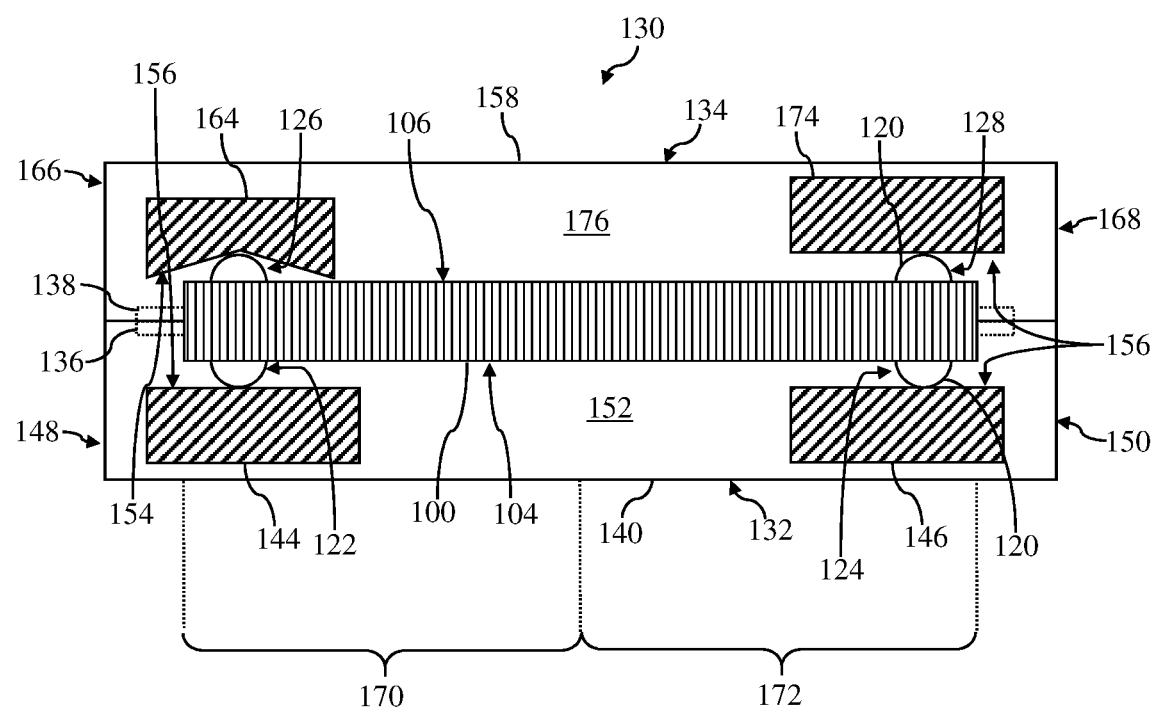

Although fixture 130 is shown and discussed herein as including first support 144 having or formed as first shape 154, and other supports (e.g., second support 146, third support 164, fourth support 174) having or formed as second shape 156, it is understood that any support 144, 146, 164, 174 of fixture 130 may have or be formed as first shape 154 or second shape 156. For example, FIGS. 15-17 show various non-limiting examples of fixture 130 including support 144, 146, 164, 174 having different formations and/or combinations of first shape 154 and/or second shape 156. Specifically, FIGS. 15-17 show various cross-sectional views of non-limiting examples of fixture 130 and component 100 positioned therein.

In the non-limiting example shown in FIG. 15, the at least two supports 144, 146 of first member 132 may each have or be formed as first shape 154. That is, first support 144 and second support 146 of first member 132 for fixture 130 may each have, include and/or be formed as first shape 154. Similar to the other non-limiting examples discussed herein, third support 164 and fourth support 174 of second member 134 may both have, include and/or be formed as second shape 156. In this non-limiting example, first support 144 having first shape 154 may contact and/or receive first group 122 of removable features 120, and second support 146 having first shape 154 may contact and/or receive second group 122 of removable features 120. As discussed herein, first support 144 and second support 146 may substantially prevent movement of component 100 and its various portions 170, 172 within fixture 130. Continuing with the firing and shrinking example discussed herein with respect to FIGS. 9-11, the non-limiting example of fixture 130 shown in FIG. 15 may substantially prevent the entirety of component 100 from moving within fixture 130, which in turn may reduce or eliminate portion's 170, 172 ability to shrink after performing the firing process.

In the non-limiting example shown in FIGS. 16 and 17, third support 164 of second member 134 may have first shape 154. Specifically in FIG. 16, first support 144 of first member 132 and third support 164 of second member 134 for fixture 130 may both have, include and/or be formed as first shape 154. In FIG. 17, only third support 164 of second member 134 for fixture 130 may have, include and/or be formed as first shape 154. In either non-limiting example, third support 164 of second member 134 having first shape 154 may substantially prevent movement of component 100 within fixture 130. That is, and similar to first support 144 discussed herein, third support 164 of second member 134 having first shape 154 may contact, receive, and substantially secure third group 126 of removable features 120 within fixture 130 to prevent movement of at least portion 170 of component 100 within fixture 130.

Figure 18:
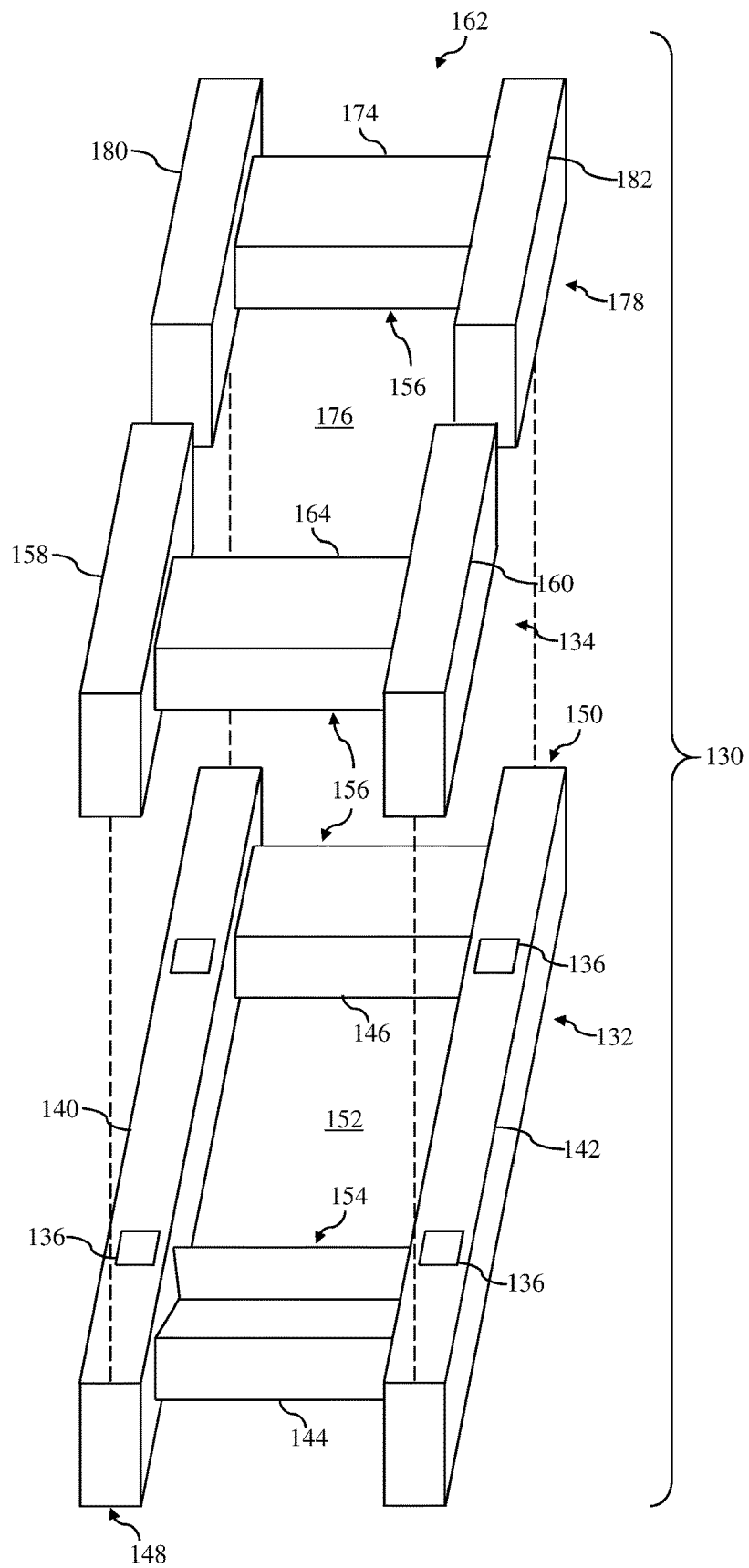
FIG. 18 shows an exploded, isometric view of a fixture for holding a component, according to further embodiments of the disclosure.
Figure 19:
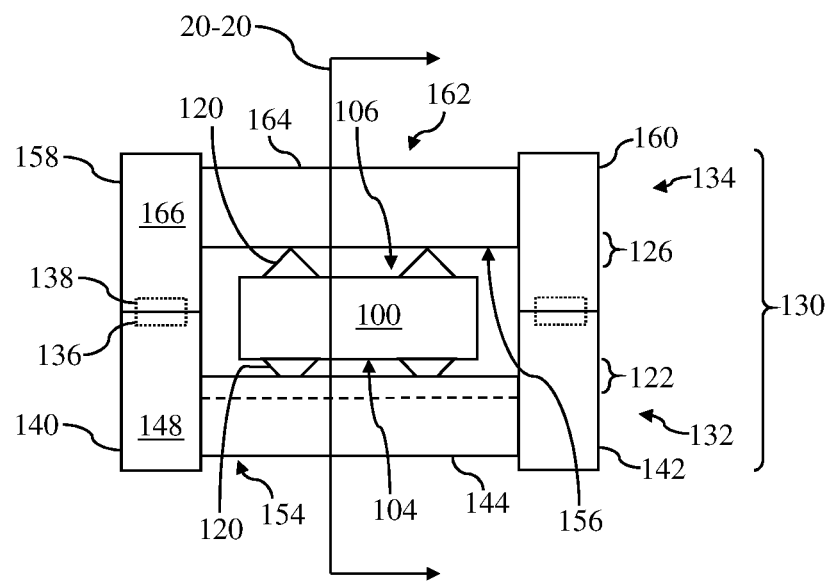
FIG. 19 shows a front view of the component of FIGS. 1-5 positioned within the fixture of FIG. 18, according to embodiments of the disclosure.
Figure 20:
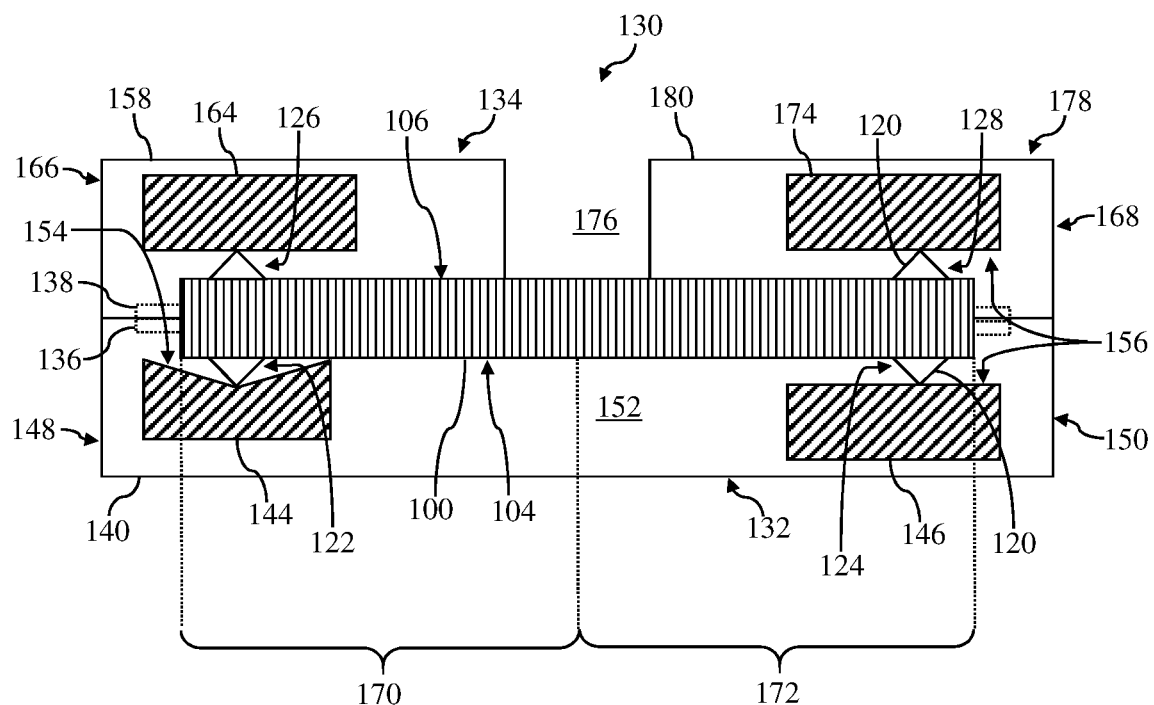
FIG. 20 shows a side, cross-sectional view of the component of FIGS. 1-5 positioned within the fixture taken along line 20-20 in FIG. 19, according to embodiments of the disclosure.

FIGS. 18-20 show various views of another non-limiting example of fixture 130. Specifically, FIG. 18 shows an exploded isometric view of fixture 130, FIG. 19 shows a front view of component 100 positioned within fixture 130 of FIG. 18, and FIG. 20 shows a side, cross-sectional view of component 100 and fixture 130 taken along line 20-20 in FIG. 19.

With comparison to FIGS. 9-11, the non-limiting example of fixture 130 shown in FIGS. 18-20 may include a smaller second member 134. That is, second member 134, and more specifically opposing side rails 158, 160 of second member 134, may not extend over the entire length of opposing side rails 140, 142 of first member 132. Rather, second member 134 may be positioned opposite first member 132, and adjacent first end 148 of first member 132. Additionally as shown in FIGS. 18-20, second member 134 may only include third support 164 extending between opposing side rails 158, 160, opposite first support 144.

Additionally as shown in the non-limiting example of FIGS. 18-20, fixture 130 may also include a third member 178. Third member 178 may be separate, separated from, and/or positioned adjacent second member 134 of fixture 130. As shown in FIGS. 18 and 20, third member 178 may be positioned opposite first member 132, and adjacent second end 150 of first member 132. Furthermore, third member 134 may also be positioned on, contact and/or be configured to contact first member 132 when positioning component 100 within fixture 130. When positioning component 100 within fixture 130, third member 178 may be substantially aligned with and coupled to first member 132, as similarly discussed herein with respect to second member 134.

Also similar to first member 132 and second member 134, third member 178 of fixture 130 may include opposing side rails 180, 182, and fourth support 174. Fourth support 174 may extend between and/or be coupled to opposing side rails 180, 182 of third member 178. Also in the non-limiting example shown in FIGS. 18-20, fourth support 174 may be positioned and/or formed adjacent second end 150 of first member 132, and may be positioned adjacent and/or opposite second support 146 of first member 132. Fourth support 174 of third member 178 may have or include second shape 156 and may contact fourth group 128 of removable features 120 formed on second surface 106 of component 100, as discussed herein. In the non-limiting example shown in FIGS. 19 and 20, the various groups 122, 124, 126, 128 of removable features 120 for component 100 may be formed as cones and/or pyramids.

Figure 21:
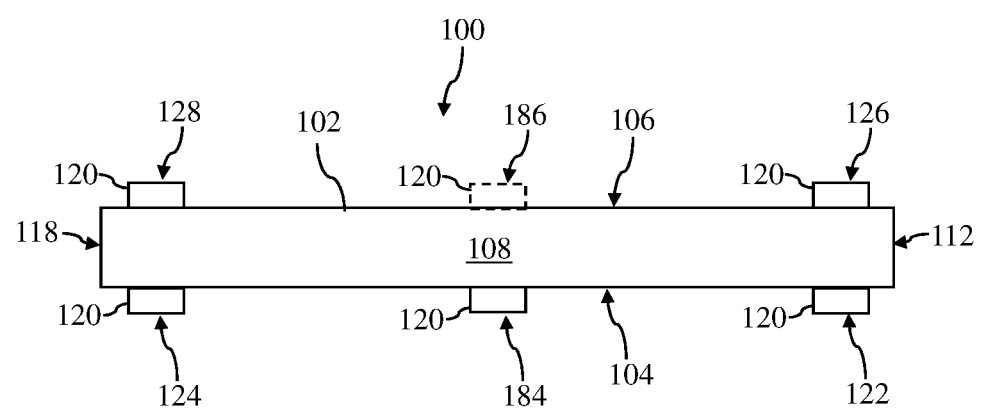
FIG. 21 shows a side view of a component include a plurality of removable features, according to additional embodiments of the disclosure.
Figure 22:
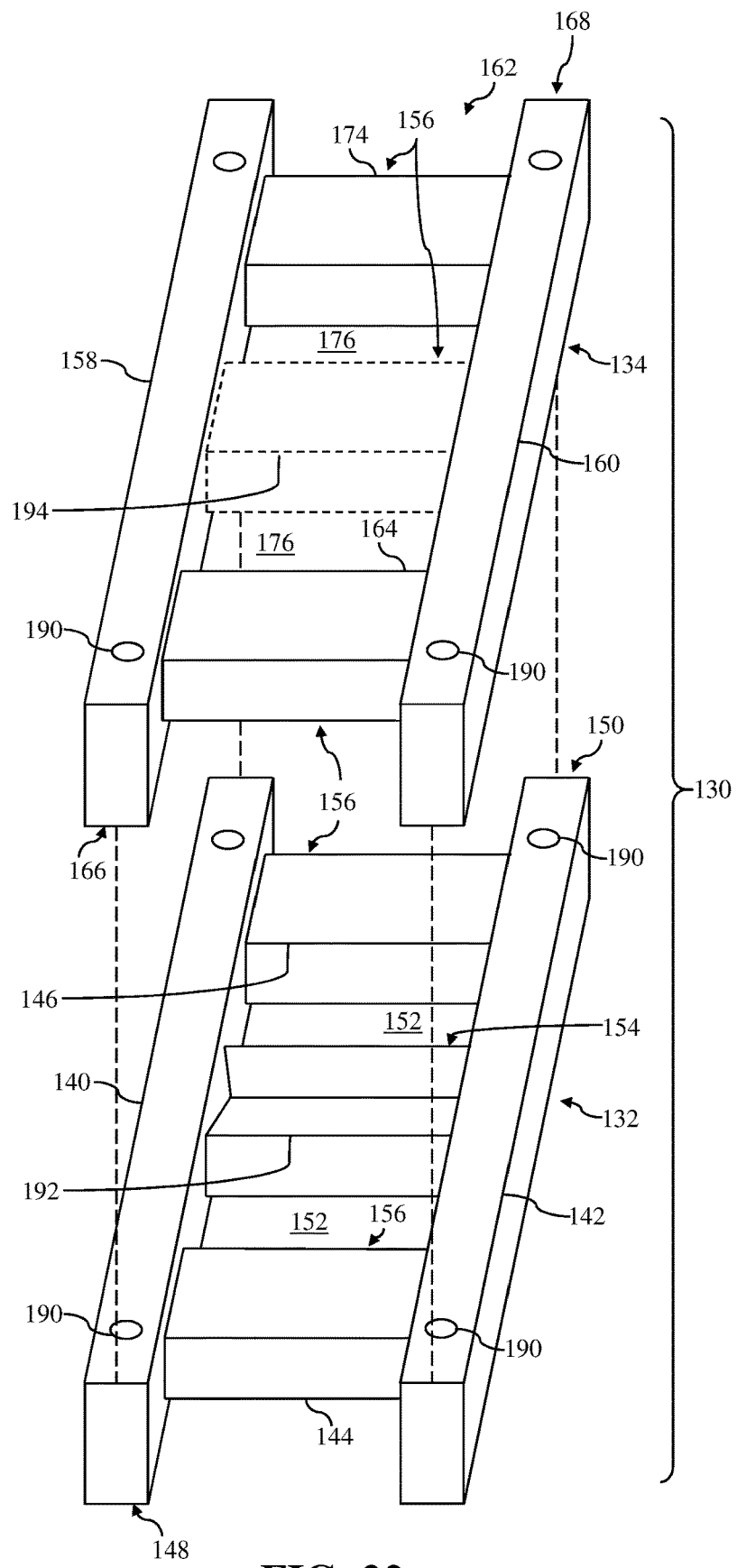
FIG. 22 shows an exploded, isometric view of a fixture for holding the component of FIG. 21, according to embodiments of the disclosure.
Figure 23:
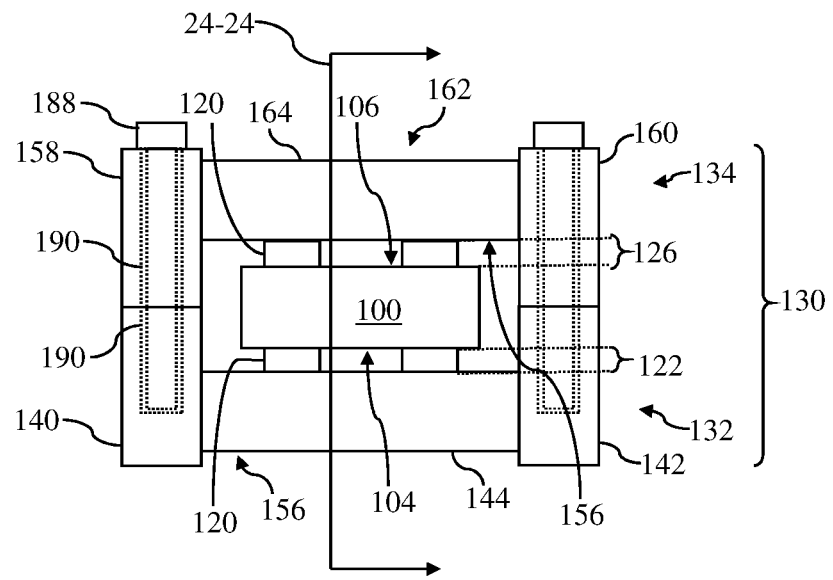
FIG. 23 shows a front view of the component of FIG. 21 positioned within the fixture of FIG. 22, according to embodiments of the disclosure.
Figure 24:
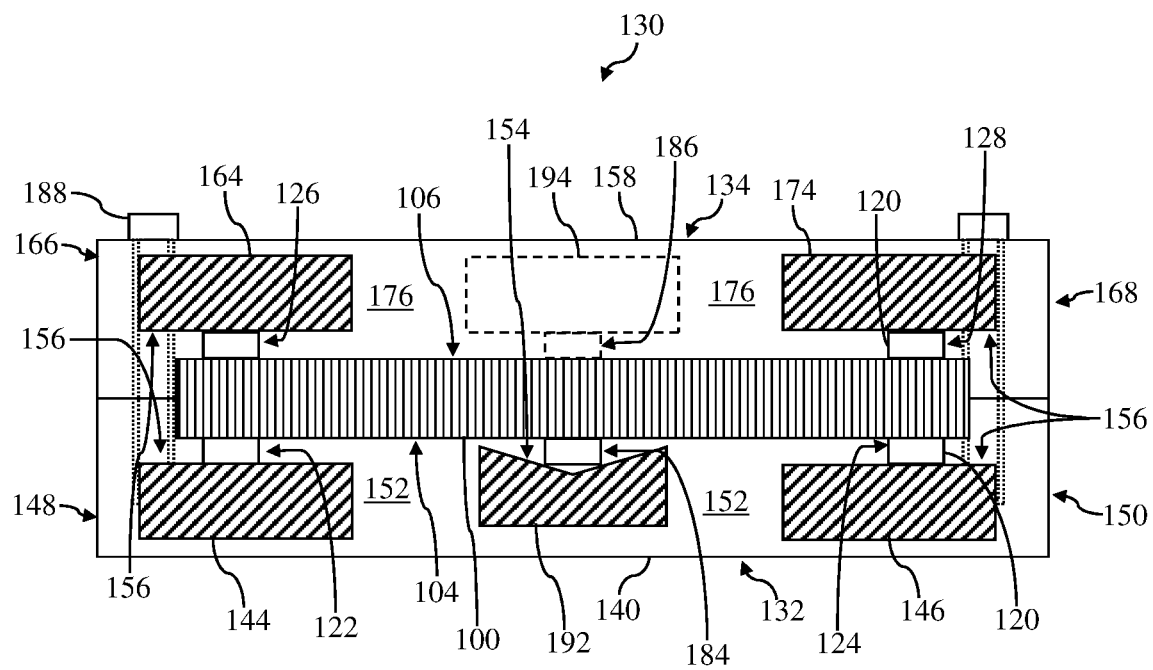
FIG. 24 shows a side, cross-sectional view of the component of FIG. 21 positioned within the fixture taken along line 24-24 in FIG. 23, according to embodiments of the disclosure.

FIGS. 21-24 show an additional non-limiting example of component 100 and fixture 130. Specifically, FIG. 21 shows a side view of another non-limiting example of component 100, FIG. 22 shows an exploded isometric view of another non-limiting example of fixture 130, FIG. 23 shows a front view of component 100 of FIG. 21 positioned within fixture 130 of FIG. 22, and FIG. 24 shows a side, cross-sectional view of component 100 and fixture 130 taken along line 24-24 in FIG. 23.

With comparison to FIGS. 1-5, component 100 shown in FIG. 21 may include other shapes for the plurality of removable features 120. Specifically, the plurality of removable features 120 of component 100 shown in FIG. 21 may be formed and/or may have a cubic or cuboid shape. As discussed herein, the cubic or cuboid shape of the plurality of removable features 120 may aid in positioning, holding, and/or securing component 100 within fixture 130 (see, FIGS. 22-24).

Additionally as shown in FIG. 21, component 100 may include additional groups of removable features 120. Specifically, component 100 may include a fifth group 184 and a sixth group 186 (shown in phantom) of removable features 120. Fifth group 184 of removable features 120 may be formed on first surface 104 of component 100, between first group 122 and second group 124 of removable features 120. Sixth group 186 of removable features 120, shown in phantom as optional, may be formed on second surface 106 of component 100, between third group 126 and fourth group 128 of removable features 120. Sixth group 186 of removable features 120 formed on second surface 106 may also be formed and/or positioned substantially opposite and/or aligned with fifth group 184 of removable features 120 formed on first surface 104.

As discussed herein, the position and/or placement of the plurality of removable features 120 on component 100 may be dependent, at least in part, on the shape of component 100, the size of component 100, elements or structures of component 100, and the like. In the non-limiting example shown in FIG. 21, fifth group 184 of removable features 120 may formed on first surface 104 of component 100 to cover and/or protect an inlet to a cooling channel (not shown) formed through component 100. The inlet may require additional support and/or protection when component 100 is positioned within fixture 130 and/or when performing manufacturing processes on component 100 positioned, held, and/or secured within fixture 130. Further, because the inlet is only formed on and/or through first surface 104, sixth group 186 of removable feature 120 may not need to be formed on second surface 106 of component 100. Additionally, or alternatively, the position and/or placement of the plurality of removable features 120 on component 100 may be dependent, at least in part, on the position and/or number of supports (e.g., supports 144, 146, 164, 174) included within fixture 130, as discussed herein.

Turning to FIGS. 22-24, another non-limiting example of fixture 130 is shown. Distinct from fixture 130 shown and discussed herein with respect to FIGS. 9-11, fixture 130 shown in FIGS. 22-24 may utilize a mechanical fastener 188 (see, FIGS. 23 and 24) to couple second member 134 to first member 132. In the non-limiting example, opposing rails 140, 142 of first member 132 and opposing rails 158, 160 of second member 134 may each include a plurality of recesses 190 (see, FIG. 22) (e.g., threaded recesses). The plurality of recesses 190 formed in first member 132 and second member 134 may be substantially aligned when second member 134 contacts first member 132, and may receive mechanical fastener 188 for releasably coupling second member 134 to first member 132. Mechanical fasteners 188 may be any suitable fastener that may releasably couple second member 134 to first member 132 including, but not limited to, a screw, a bolt, a pin, a rivet, and the like.

Additionally as shown in the non-limiting example, fixture 130 may include additional supports. Specifically, the at least two support members of first member 132 for fixture 130 may include a fifth support 192, in addition to first support 144 and second support 146. Fifth support 192 may extend between and/or be coupled to opposing side rails 140, 142 of first member 132. Also in the non-limiting example shown in FIGS. 22 and 24, fifth support 192 may be positioned and/or formed between first support 144 and second support 146. Similar to first support 144 and/or second support 146, fifth support 192 may be formed separate from and, may be separated from first support 144 and second support 146 within first member 132. As a result of fifth support 192 being formed separate and/or separated from first support 144 and second support 146, first member 132 may include two openings 152. Specifically, a first opening 152 of first member 132 may be formed between opposing side rails 140, 142, and first support 144 and fifth support 192, respectively. Additionally, a second opening 152 of first member 132 may be formed between opposing side rails 140, 142, and second support 146 and fifth support 192, respectively. As discussed herein, openings 152 formed in first member 132 of fixture 130 may provide access to at least a portion of component 100 through first member 132.

In the non-limiting example, fifth support 192 of first member 132 may contact and/or receive fifth group 184 of removable features 120 formed on component 100. Specifically, fifth group 184 of removable features 120 formed on first surface 104 of component 100 may contact and/or be received by fifth support 192 of first member 132. As shown in FIG. 24, fifth support 192 of first member 132 may have first shape 154, while first support 144 of first member 132 may have second shape 156. As similarly discussed herein with respect to FIGS. 14-17, the shapes of supports 144, 146, 192 of first member 132 may allow or prevent movement of portions of component 100 within fixture 130. For example, because fifth support 192 is formed to have first shape 154, a central portion of component 100 (e.g., portion substantially surrounding fifth support 192) may be prevented from moving (e.g., expansion/growth, contraction/shrinkage) within fixture 130. Additionally in the non-limiting example shown in FIGS. 22-24, because first support 144 and second support 146 are each formed to have second shape 156, opposing end portions of component 100 (e.g., portions formed adjacent first end 112/second 118) may be allowed to move (e.g., expansion/growth, contraction/shrinkage) within fixture 130.

Additionally, the at least one support member of second member 134 for fixture 130 may include a sixth support 194 (shown in phantom), in addition to third support 164 and fourth support 174. Sixth support 194 may extend between and/or be coupled to opposing side rails 158, 160 of second member 134. Also in the non-limiting example shown in FIGS. 22 and 24, sixth support 194 may be positioned and/or formed between third support 164 and fourth support 174. Similar to third support 164 and/or fourth support 174, sixth support 194 may be formed separate from and, may be separated from third support 164 and fourth support 174 within second member 134. As a result of sixth support 194 being formed separate and/or separated from third support 164 and fourth support 174, second member 134 may include two openings 176. Specifically, a first opening 176 of second member 134 may be formed between opposing side rails 158, 160, and third support 164 and sixth support 194, respectively. Additionally, a second opening 176 of second member 134 may be formed between opposing side rails 158, 160, and fourth support 174 and sixth support 194, respectively. As discussed herein, openings 176 formed in second member 134 of fixture 130 may provide access to at least a portion of component 100 through second member 134. Sixth support 194 may be shown in phantom as optional within fixture 130.

In a non-limiting example, when second member 134 contacts and/or is releasably coupled to first member 132 to position component 100 within fixture 130, sixth support 194 may be positioned substantially opposite and/or may be aligned with fifth support 192 of first member 132. Sixth support 194 of second member 134 may contact and/or receive sixth groups 186 of removable features 120 formed on component 100. Specifically, sixth group 186 of removable features 120 formed on second surface 106 of component 100 may contact and/or be received by sixth support 194 of second member 134. As shown in FIG. 24, sixth support 194 of second member 134 may have second shape 156.

Sixth support 194 of second member 134 for fixture 130 is shown in phantom as optional. In a non-limiting example, sixth support 194 may be formed on and/or included within second member 134 dependent on whether sixth group 186 of removable features 120 are formed on component 100. Alternatively, sixth support 194 may be formed in second member 134 regardless of component 100 including sixth group 186 of removable features 120. In the non-limiting example where sixth group 186 of removable features 120 are not formed on component 100, sixth support 194 may be positioned adjacent and separated from second surface 106 of component 100 when component 100 is positioned, held, and/or secured within fixture 130, as discussed herein.

It is understood that the number of supports included with fixture 130 do not have to match the number of groups of removable features 120 on component 100 in order for fixture 130 to position, hold, and/or secure component 100 therein. For example, component 100 shown in FIGS. 1-5 including four groups 122, 124, 126, 128 of removable features 120 may be positioned, held, and/or secured within the non-limiting example of fixture 130 including six supports 144, 146, 164, 174, 192, 194, as shown and discussed herein with respect to FIGS. 22-24. As a result, a single fixture 130 may be configured to and/or capable of positioning, holding, and/or securing distinct components having distinct features (e.g., removable features 120).

Figure 25:
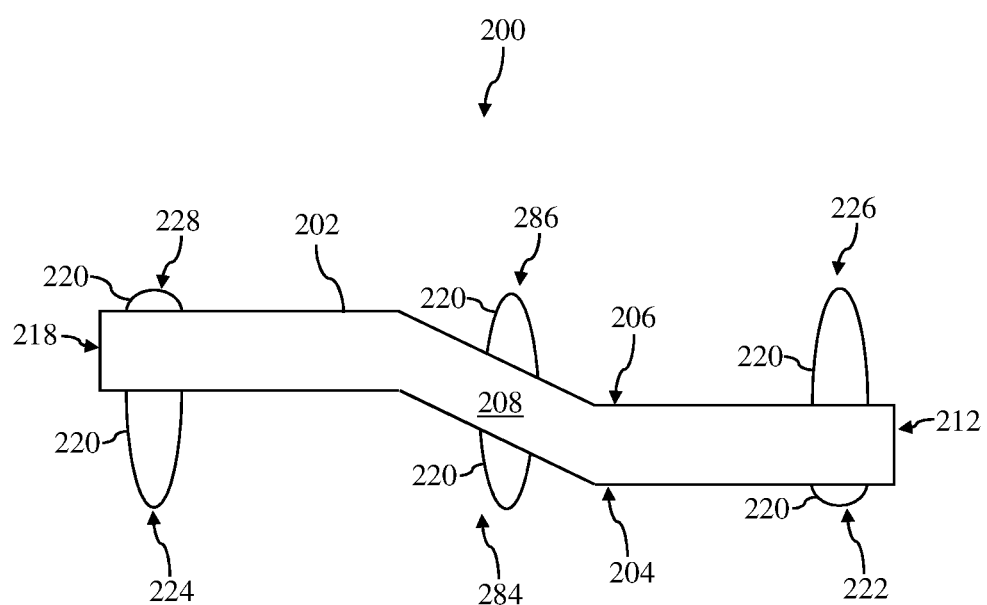
FIG. 25 shows a side view of a substantially curved component include a plurality of removable features, according to additional embodiments of the disclosure.

Additionally, a single fixture 130 may be configured to and/or capable of positioning, holding, and/or securing distinct components having distinct shapes. For example, and as discussed herein, component 100 shown in FIGS. 1-5 and component 100 shown in FIG. 21 may be positioned, held, and/or secured within fixture 130 including six supports 144, 146, 164, 174, 192, 194 (see, FIGS. 22-24) without altering fixture 130. Additionally, component 200 shown in FIG. 25 may also be positioned, held, and/or secured within fixture 130 including six supports 144, 146, 164, 174, 192, 194 without altering fixture 130 (see, FIG. 27). As shown in FIG. 25, component 200 may include body 202 that may be substantially curved, bent, angled, and/or swept between first end 112 and second end 118. That is, body 202 of component 200 may be substantially non-linear and/or may include a shape that includes, curves, contours, and/or level changes from first end 112 to second end 118. In the non-limiting example shown in FIG. 25, substantially curved body 202 of component 200 may include opposing linear portions formed adjacent first end 112 and second end 118, respectively, and a central portion formed between the linear portions that may form the substantially bent, angled, curved, and/or swept shape of component 200. In the non-limiting example the central portion of body 202 of component 200 may also be substantially linear to form substantially curved body 202 and/or component 200. In another non-limiting (not shown), central portion of body 202 of component 200 may be substantially curved and/or arched. In additional non-limiting examples (not shown), component 200 may be substantially curved as a result of body 202 including a continuous-curvature between first end 112 and second 118, or body 202 including one or more linear portions and one or more curved, bent, angled, and/or swept portions formed between first end 112 and second 118.

To ensure fixture 130 including six supports 144, 146, 164, 174, 192, 194 may receive, hold, and/or secure component 200, the size of removable features 220 of component 200 may be adjusted and/or altered. That is, and with comparison to removable features discussed herein with respect to FIGS. 1-5 and 21, removable features 220 of component 200 shown in FIG. 25 may be of varying size and/or shape. As shown in the non-limiting example of FIGS. 25-27, the various groups 222, 224, 226, 228, 284, 286 of removable features 220 for component 200 may be formed as a hemisphere or an ellipsoid having varying sizes. The size of the various groups 222, 224, 226, 228, 284, 286 of removable features 220 for component 200 may be varied based on the shape of component 200.

Figure 26:
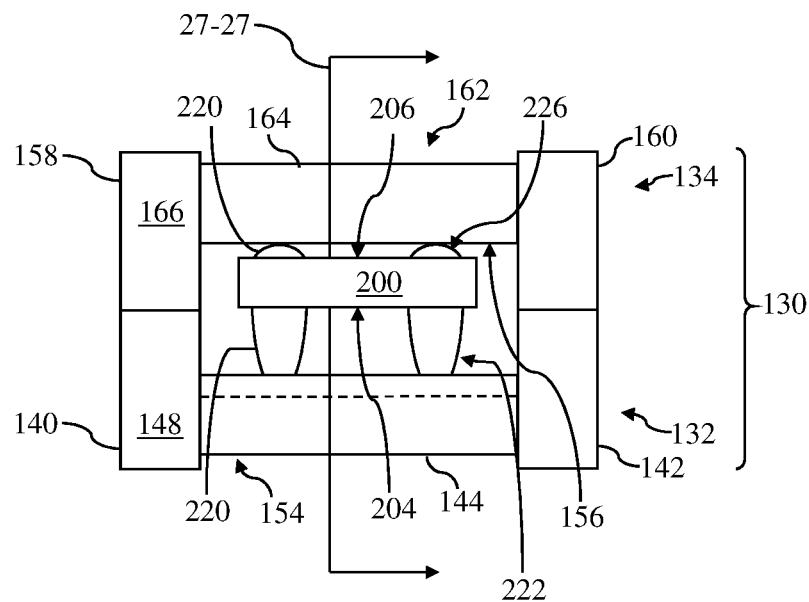
FIG. 26 shows a front view of the component of FIG. 25 positioned within a fixture, according to embodiments of the disclosure.
Figure 27:
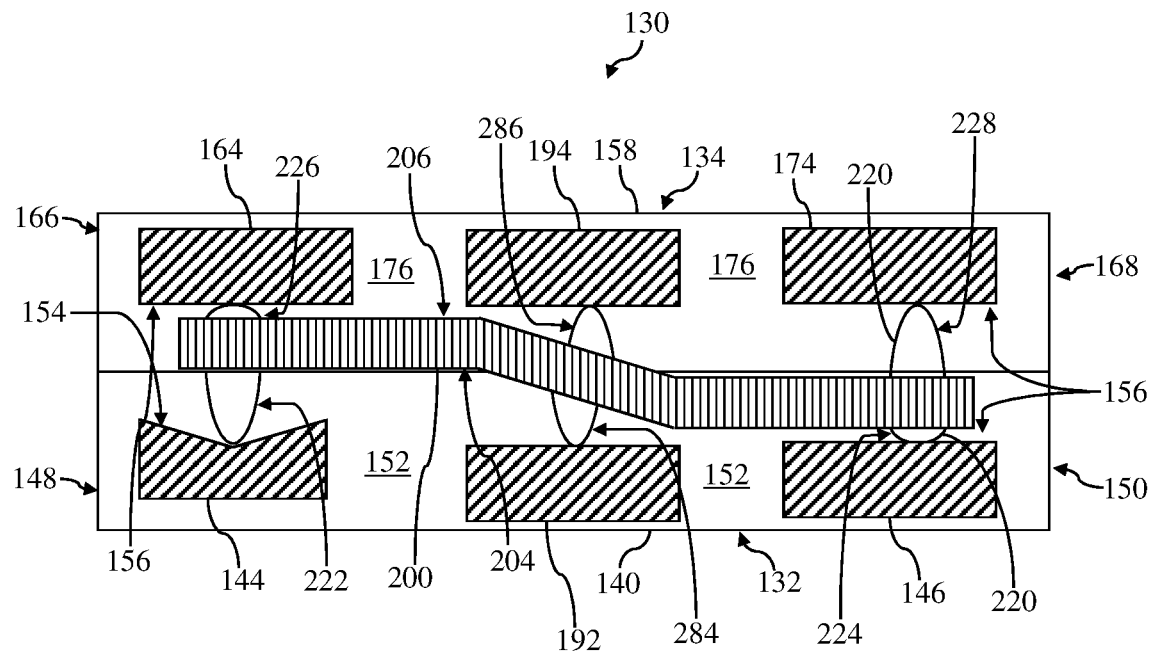
FIG. 27 shows a side, cross-sectional view of the component of FIG. 25 positioned within the fixture taken along line 27-27 in FIG. 26, according to embodiments of the disclosure.

For example, and with reference to FIGS. 25-27, first group 222 and fourth group 228 of removable features 220 for component 200 may include larger and/or longer removable features 220. First group 222 and fourth group 228 of removable features 220 may be larger and/or than the remaining removable features 220 of component 200 because first group 222 and fourth group 228 of removable features 220 are positioned furthest from the respective supports 144, 174 of fixture 130 receiving the removable features 220 than the remaining removable features 220 of component 200 from their respective supports 146, 164, 192, 194. Specifically, and because of the substantially curved shape of component 200, first group 222 of removable features 220 for component 200 is positioned further from first support 142 of first member 132 for fixture 130 than third group 226 of removable features 220 is positioned from third support 164 of second member 134 for fixture 130. As such, and in order for first group 222 of removable features 220 for component 200 to contact first support 144, first group 222 of removable features 220 may be longer and/or larger than third group 226 of removable features 220 contacting third support 164. Similarly, fourth group 228 of removable features 220 for component 200 is positioned further from fourth support 174 of second member 134 for fixture 130 than second group 224 of removable features 220 for component 200 is positioned from second support 144 of first member 132 for fixture 130. As such, and in order for fourth group 228 of removable features 220 to contact fourth support 174, fourth group 228 of removable features 220 may be longer and/or larger than second group 224 of removable features 220 contacting second support 144.

As shown in FIGS. 25 and 27, fifth group 284 and sixth group 286 of removable features 220 for component 200 may be centrally formed on component 200 and/or may be formed on the substantially curved and/or angled portion of component 200. In this non-limiting example, fifth group 284 and sixth group 286 of removable features 220 may be equidistant from the corresponding supports 192, 194 of fixture 130. Specifically, the distance between fifth group 284 of removable features 220 and fifth support 192 of first member 132 may be equal to the distance between sixth group 286 of removable features 220 and sixth support 194 of second member 134. As such, fifth group 284 and sixth group 286 of removable features 220 for component 200 may be equal in size. Additionally, and as shown in the non-limiting example of FIGS. 25 and 27, fifth group 284 and sixth group 286 of removable features 220 may be larger than second group 224 and third group 226 of removable features 220, but may be smaller than first group 222 and fourth group 228 of removable features 220.

Figure 28:
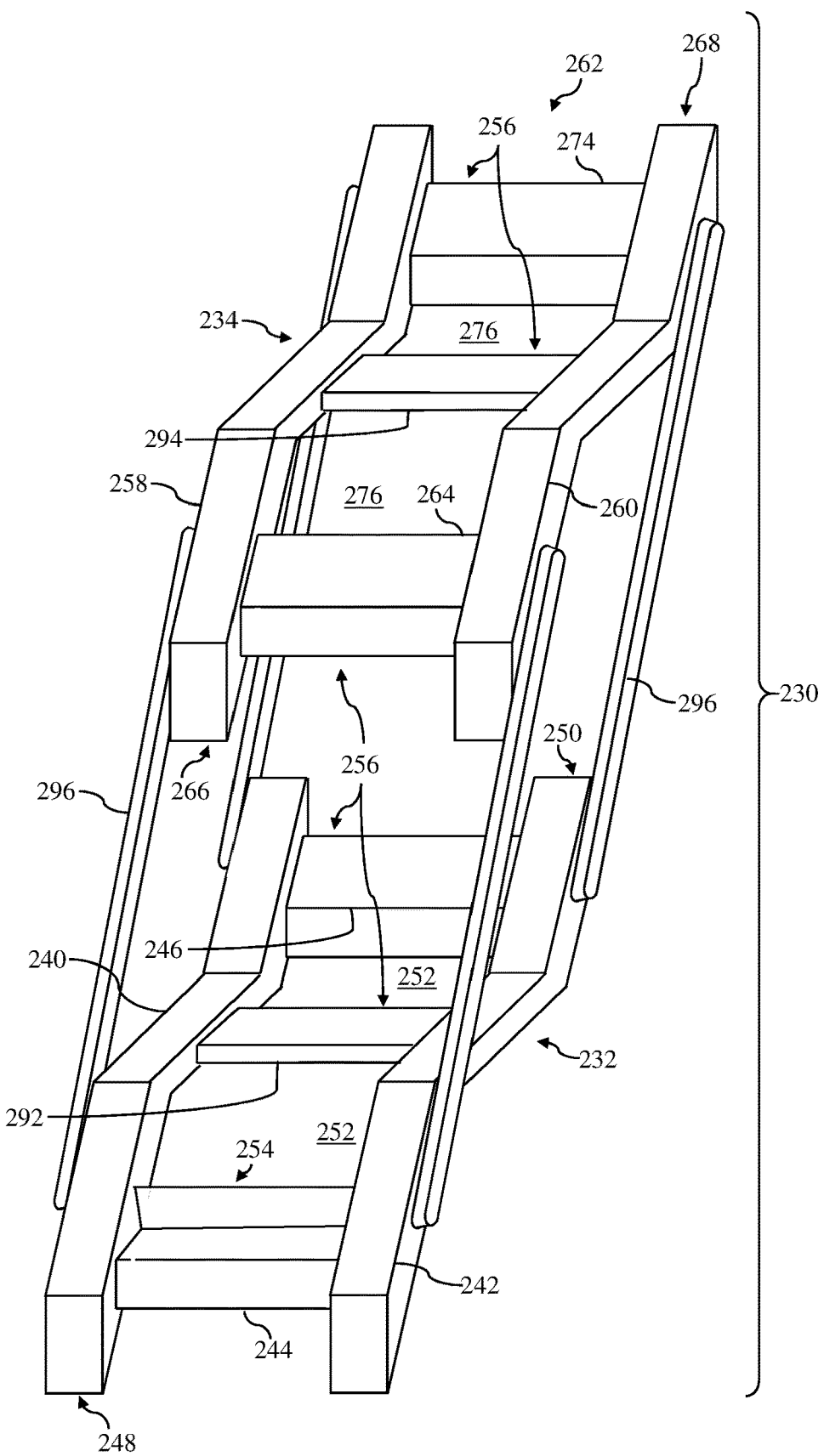
FIG. 28 shows an exploded, isometric view of a substantially curved fixture for holding the component of FIG. 25, according to embodiments of the disclosure.
Figure 29:
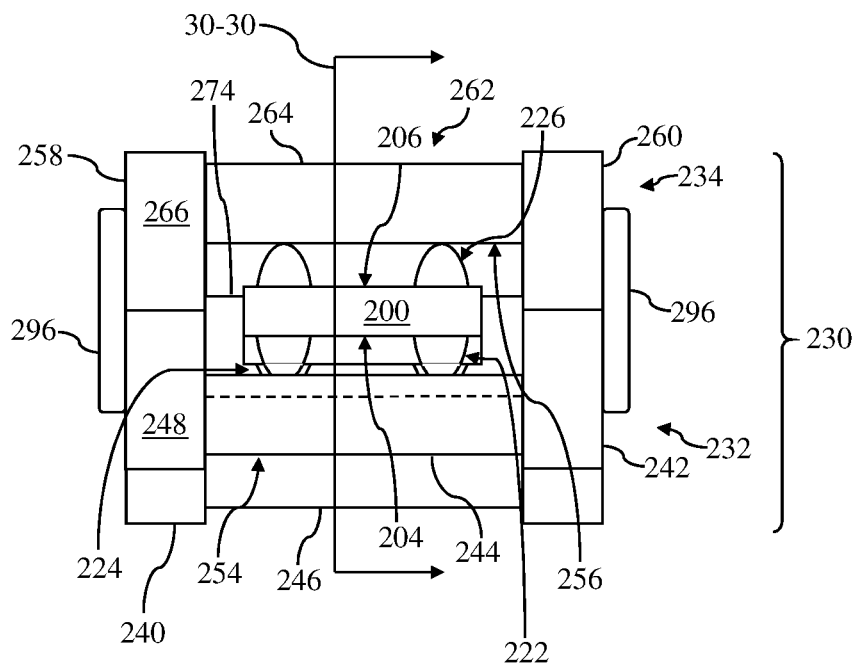
FIG. 29 shows a front view of the component of FIG. 25 positioned within the fixture of FIG. 28, according to embodiments of the disclosure.
Figure 30:
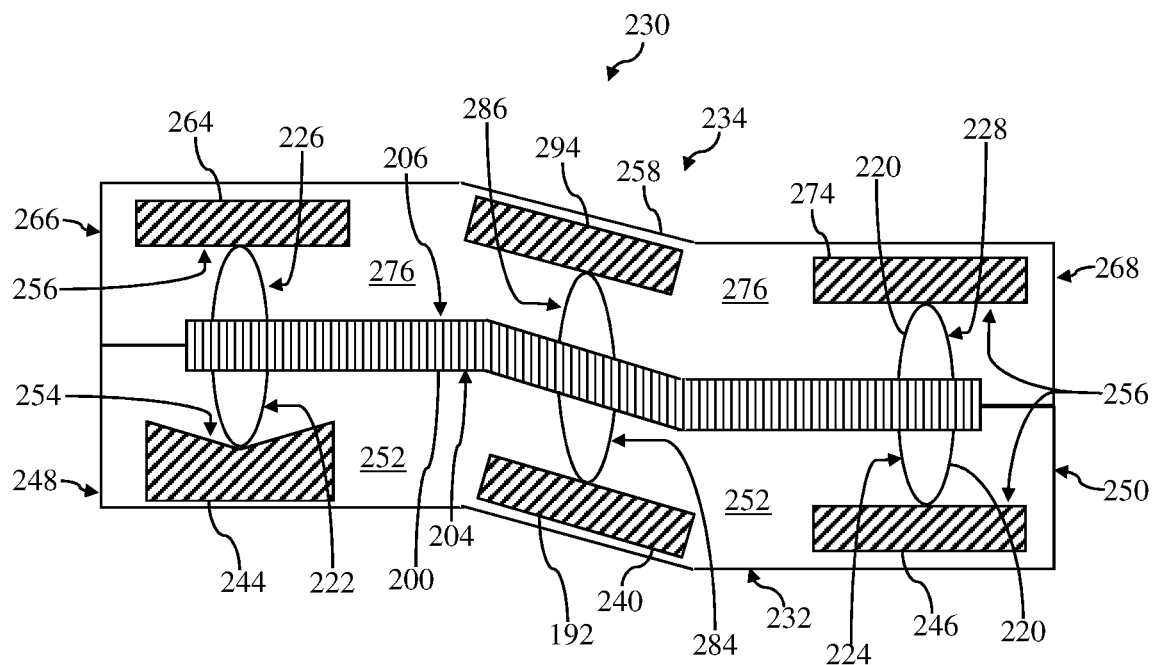
FIG. 30 shows a side, cross-sectional view of the component of FIG. 25 positioned within the fixture taken along line 30-30 in FIG. 29, according to embodiments of the disclosure.

In another non-limiting example, the fixture may also include a corresponding curved shape. As shown in FIGS. 28-30, fixture 230 may be substantially curved, bent, angled, and/or swept. Specifically, opposing side rails 240, 242 of first member 232 may be curved, bent, angled, and/or swept between first end 248 and second end 250 of first member 232. Additionally, opposing side rails 258, 260 of second member 234 forming fixture 230 may be curved, bent, angled, and/or swept between first end 266 and second end 268 of second member 234. The substantially curved shape of first member 232 may correspond and/or may be similar to the substantially curved shape of second member 234, such that when second member 234 contacts and/or is positioned on first member 232 to position component 130 therein, no space exists between first member 232 and second member 234 (see, FIG. 30). In the non-limiting example shown in FIGS. 28 and 29, second member 234 may be moved, positioned over, contact, and/or releasably coupled to first member 232 using hinges 296 positioned on and coupled to opposing side rails 240, 242 of first member 232 and opposing side rails 258, 260 of second member 234, respectively.

Additionally, the substantially curved shape of first member 232 and second member 234 may also correspond and/or may be similar to the substantially curved shape of component 200. As a result of the substantially curved shape of first member 232 and second member 234 of fixture 230 correspond and/or being similar to the substantially curved shape of component 200, the size of removable features 220 formed on component 200 may be constant and/or equal. Specifically in the non-limiting example shown in FIG. 30, each of the groups 222, 224, 226, 228, 284, 286 of removable features 220 formed on component 200 may be equidistant from the corresponding support 244, 246, 264, 274, 292, 294 of fixture 230.

In the non-limiting example shown in FIGS. 28-30, and as similarly discussed herein with respect to substantially curved body 202 of component 200 shown in FIG. 25, each of first member 232 and second member 234 of fixture 230 may include opposing linear portions formed adjacent opposing ends 248, 250 of first member 232 and opposing ends 266, 268 of second member 234, respectively, and a central portion formed between the linear portions that may form the substantially bent, angled, curved, and/or swept shape of fixture 230 (e.g., first member 232, second member 234). In the non-limiting example the central portion of each of first member 232 and second member 234 may also be substantially linear to form substantially curved fixture 230. In another non-limiting (not shown), central portion of first member 232 and second member 234 forming fixture 230 may be substantially curved and/or arched. In additional non-limiting examples (not shown), first member 232 and second member 234 of fixture 230 may be substantially curved as a result of each of first member 232 and second member 234 including a continuous-curvature between opposing ends 248, 250, 266, 268, or first member 232 and second member 234 may each include one or more linear portions and one or more curved, bent, angled, and/or swept portions formed between opposing ends 248, 250, 266, 268.

Figure 31:
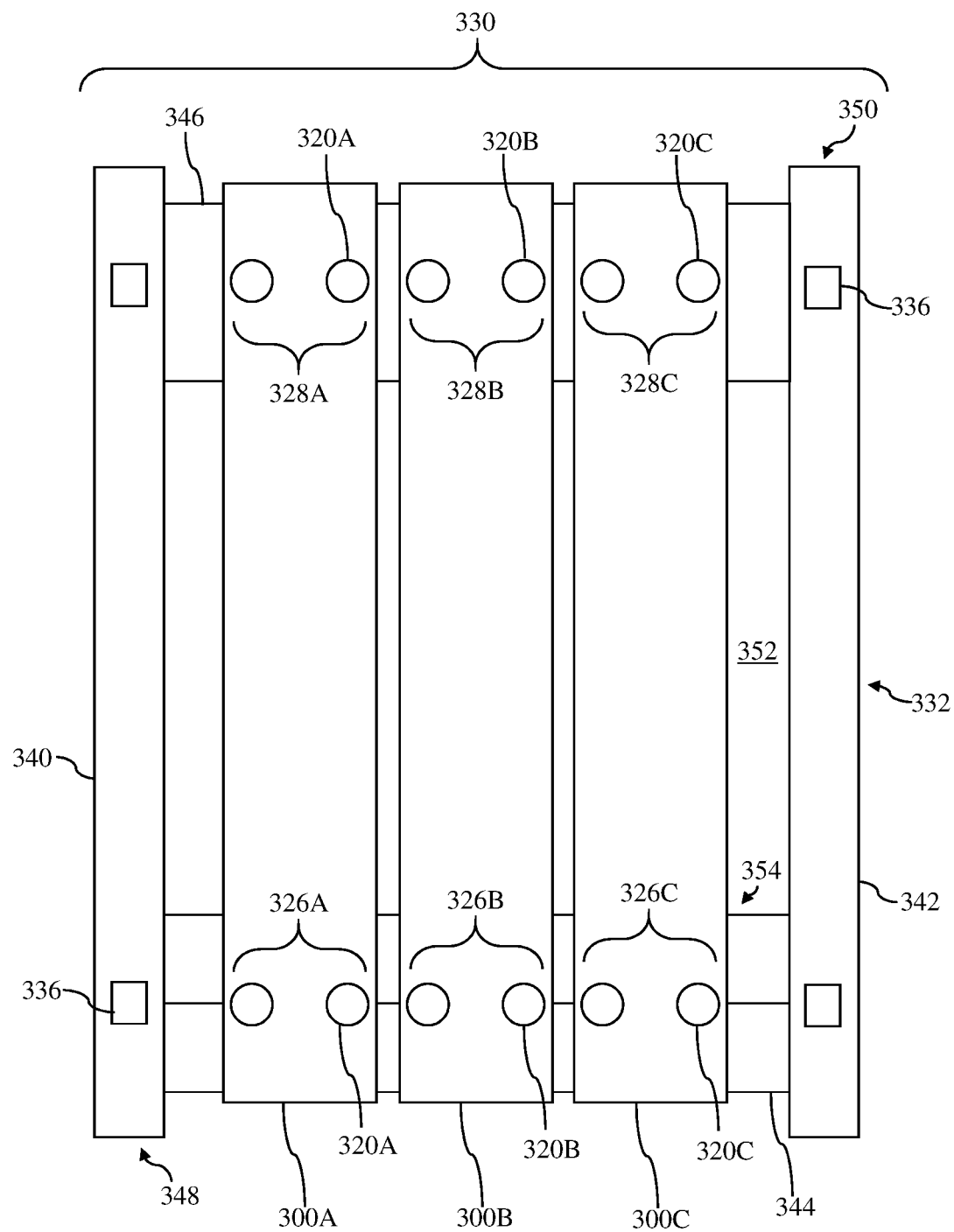
FIG. 31 shows a top view of a plurality of components positioned within a first member of a fixture, according to embodiments of the disclosure.
Figure 32:
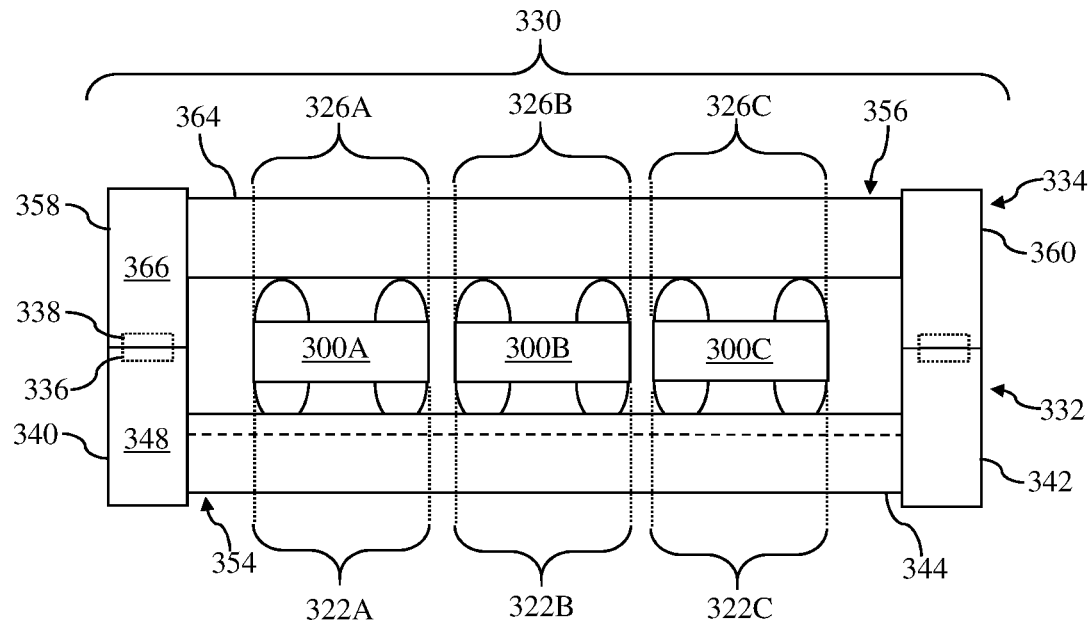
FIG. 32 shows a front view of the plurality of components positioned between the first member and a second member of the fixture shown in FIG. 31, according to embodiments of the disclosure.
Figure 33:
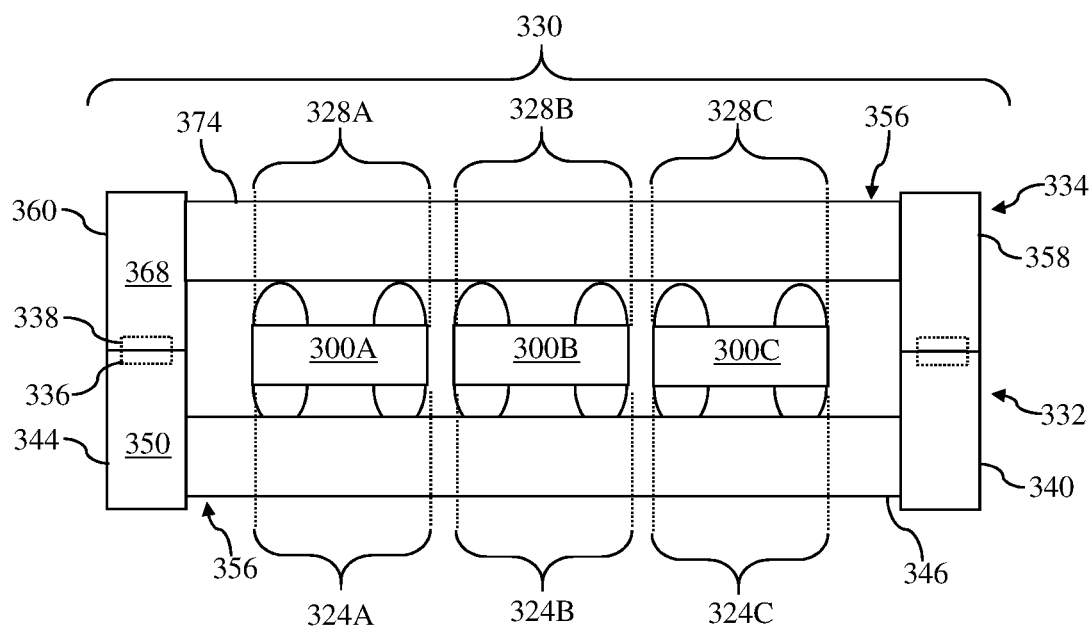
FIG. 33 shows a back view of the plurality of components positioned between the first member and a second member of the fixture shown in FIG. 31, according to embodiments of the disclosure.

Although discussed herein as only positioning, holding, and/or securing a single component within the fixture, it is understood that a plurality of components may be held by a single fixture when performing the manufacturing process(es) on the plurality of components. For example, and as shown in FIGS. 31-33, a plurality of components 300A, 300B, 300C may be positioned, held, and/or secured within a single fixture 330. Specifically, FIG. 31 shows a top view of a plurality of components 300A, 300B, 300C positioned within first member 332 of fixture 330 (second member 334 omitted for clarity), FIG. 32 shows a front view of the plurality of components 300A, 300B, 300C positioned between first member 332 and second member 334 of fixture 330, and FIG. 33 shows a back view of the plurality of components 300A, 300B, 300C positioned between first member 332 and second member 334 of fixture 330. Components 300A, 300B, 300C may be substantially similar to component 100 discussed herein with respect to FIGS. 1-5. Additionally, fixture 330 may be may be substantially similar to component 100 discussed herein with respect to FIGS. 6-8. It is understood that similarly numbered and/or named components may function in a substantially similar fashion. Redundant explanation of these components has been omitted for clarity.

As shown in FIGS. 31-33, and as similarly discussed herein, each of the groups 322, 324, 326, 328 of removable features 320 for components 300A, 300B, 300C may contact and/or be received by a corresponding support 344, 346, 364, 374 of fixture 330. Specifically, and as shown in FIG. 32, first group 322A of removable features 320A for component 300A, first group 322B of removable features 320B for component 300B, and first group 322C of removable features 320C for component 300C may all contact and/or be received by first support 344 formed on first member 332 of fixture 330. Similarly shown in FIG. 32, third group 326A of removable features 320A for component 300A, third group 326B of removable features 320B for component 300B, and third group 326C of removable features 320C for component 300C may all contact and/or be received by third support 364 formed on second member 334 of fixture 330.

Turning to FIG. 33, second group 324A of removable features 320A for component 300A, second group 324B of removable features 320B for component 300B, and second group 324C of removable features 320C for component 300C may all contact and/or be received by second support 346 formed on first member 332 of fixture 330. Additionally as shown in FIG. 33, fourth group 328A of removable features 320A for component 300A, fourth group 328B of removable features 320B for component 300B, and fourth group 328C of removable features 320C for component 300C may all contact and/or be received by fourth support 374 formed on second member 334 of fixture 330. As similarly, discussed herein fixture 330 may substantially position, hold, and/or secure the plurality of components 300A, 300B, 300C between first member 332 and second member 334 to allow a user (e.g., machinist) or system (e.g., computer numerical control (CNC) system) to handle fixture 330 and/or to perform manufacturing process(es) on components 300A, 300B, 300C.

Technical effect is to provide a fixture that may position, hold, and/or secure various components therein and aid in performing manufacturing process(es) on the various components. The fixture may hold a plurality of similarly shaped components, and/or may hold various components having distinct shapes and/or features.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A fixture for holding a component, the component including a plurality of removable features formed on a first surface and a second surface of the component, the fixture comprising:
   a first member including:
      two opposing side rails positioned opposite and parallel to one another; and
      at least two supports extending between and coupled to each of the two opposing side rails, the at least two supports configured for contacting the plurality of removable features formed on the first surface of the component, wherein the at least two supports of the first member have ends, one end of the at least two supports of the first member being coupled to one of the two opposing side rails of the first member and the other end being coupled to the other of the two opposing side rails of the first member; and
   a second member contacting the first member, and for positioning the component between the first member and the second member, the second member including:
      two opposing side rails positioned opposite and parallel to one another, the two opposing side rails of the second member configured to be positioned on and configured for contacting the two opposing side rails of the first member; and
      at least two supports extending between and coupled to each of the two opposing side rails of the second member, the at least one support configured for contacting the plurality of removable features formed on the second surface of the component, wherein the at least one support contacts the plurality of removable features when the two opposing side rails of the second member contact the two opposing side rails of the first member, wherein the at least two supports of the second member have ends, one end of the at least two supports of the second member being coupled to one of the two opposing side rails of the second member and the other end being coupled to the other of the two opposing side rails of the second member, and
      wherein the at least two opposing side rails of the first member are configured for directly contacting the two opposing side rails of the second member, when a workpiece is disposed in the fixture.

2. The fixture of claim 1, wherein the at least two supports of the first member include:
   a first support extending between and coupled to each of the two opposing side rails, the first support contacting a first group of removable features of the plurality of removable features formed on the first surface of the component; and
   a second support positioned adjacent the first support, the second support extending between and coupled to each of the two opposing side rails to contact a second group of removable features of the plurality of removable features formed on the first surface of the component.

3. The fixture of claim 2, wherein the at least one support of the second member includes:
   a third support extending between and coupled to each of the two opposing side rails of the second member, the third support positioned substantially opposite the first support of the first member for contacting a third group of removable features of the plurality of removable features formed on the second surface of the component.

4. The fixture of claim 3, further comprising:
   a third member positioned adjacent the second member, the third member including:
      two opposing side rails positioned opposite and parallel to one another, the two opposing side rails of the third member configured to be positioned on and configured for contacting the two opposing side rails of the first member for positioning the component between the first member and the third member; and
      a fourth support extending between and coupled to each of the two opposing side rails of the third member, the fourth support positioned substantially opposite the second support of the first member to contact a fourth group of removable features of the plurality of removable features formed on the second surface of the component.

5. The fixture of claim 3, wherein the at least one support of the second member includes:
   a fourth support extending between and coupled to each of the two opposing side rails of the second member, the fourth support positioned adjacent the third support of the second member and substantially opposite the second support of the first member to contact a fourth group of removable features of the plurality of removable features formed on the second surface of the component.

6. The fixture of claim 5, wherein the at least two supports of the first member further includes:
   a fifth support extending between and coupled to each of the two opposing side rails of the first member, the fifth support positioned between the first support and the second support to contact a fifth group of removable features of the plurality of removable features formed on the first surface of the component.

7. The fixture of claim 6, wherein the at least one support of the second member includes:
   a sixth support extending between and coupled to each of the two opposing side rails of the second member, the sixth support positioned between the third support and the fourth support,
   wherein the sixth support is positioned substantially opposite the fifth support of the first member to contact a sixth group of removable features of the plurality of removable features formed on the second surface of the component.

8. The fixture of claim 1, wherein each of the at least two supports of the first member has one of:
   a first shape configured to receive the plurality of removable features formed on the first surface of the component and substantially prevent movement of at least a portion of the component, or
   a second shape, distinct from the first shape, the second shape configured to receive the plurality of removable features formed on the first surface of the component and allow movement of at least the portion of the component.

9. The fixture of claim 8, wherein the at least one support of the second member has one of:
   the first shape configured to receive the plurality of removable features formed on the second surface of the component and substantially prevent movement of at least the portion of the component, or the second shape, distinct from the first shape, the second shape configured to receive the plurality of removable features formed on the second surface of the component and allow movement of at least the portion of the component.

10. The fixture of claim 1, wherein the first member further includes: an opening formed between the at least two supports, the opening providing access to at least a portion of the component.

11. The fixture of claim 1, wherein the two opposing side rails of the second member are releasably coupled to the two opposing side rails of the first member.

12. The fixture of claim 1, wherein the two opposing side rails of the first member are substantially curved between two opposing ends of the two opposing side rails of the first member, and
the two opposing side rails of the second member are substantially curved between two opposing ends of the two opposing side rails of the second member, the curved opposing side rails of the second member having a corresponding shape to the curved opposing side rails of the first member.

13. A fixture for holding a component, the component including a plurality of removable features formed on a first surface and a second surface of the component, the fixture comprising:
a first member including:
two opposing side rails positioned opposite and parallel to one another; and
at least two supports extending between and coupled to each of the two opposing side rails, the at least two supports configured for contacting the plurality of removable features formed on the first surface of the component, wherein the at least two supports of the first member have ends, one end of the at least two supports of the first member being coupled to one of the two opposing side rails of the first member and the other end being coupled to the other of the two opposing side rails of the first member; and
a second member contacting the first member, and for positioning the component between the first member and the second member, the second member including:
two opposing side rails positioned opposite and parallel to one another, the two opposing side rails of the second member configured to be positioned on and configured for contacting the two opposing side rails of the first member; and
at least two supports extending between and coupled to each of the two opposing side rails of the second member, the at least one support configured for contacting the plurality of removable features formed on the second surface of the component, wherein the at least one support contacts the plurality of removable features when the two opposing side rails of the second member contact the two opposing side rails of the first member, wherein the at least two supports of the second member have ends, one end of the at least two supports of the second member being coupled to one of the two opposing side rails of the second member and the other end being coupled to the other of the two opposing side rails of the second member, and
wherein the at least two opposing side rails of the first member are configured for directly contacting the two opposing side rails of the second member, wherein the at least two supports of the first member include:

a first support extending between and coupled to each of the two opposing side rails, the first support contacting a first group of removable features of the plurality of removable features formed on the first surface of the component; and
a second support positioned adjacent the first support, the second support extending between and coupled to each of the two opposing side rails to contact a second group of removable features of the plurality of removable features formed on the first surface of the component, and wherein the at least one support of the second member includes:
a third support extending between and coupled to each of the two opposing side rails of the second member, the third support positioned substantially opposite the first support of the first member for contacting a third group of removable features of the plurality of removable features formed on the second surface of the component, wherein the third support is positioned substantially opposite the second support of the first member and contacts a fourth group of removable features of the plurality of removable features formed on the second surface of the component.

14. An assembly comprising:
a component including:
a first surface;
a second surface positioned opposite the first surface; and
a plurality of removable features formed on the first surface and the second surface; and
a fixture for holding the component, the fixture including:
a first member including:
two opposing side rails positioned opposite and parallel to one another; and
at least two supports extending between and coupled to each of the two opposing side rails, the at least two supports configured for contacting the plurality of removable features formed on the first surface of the component, wherein the at least two supports of the first member have ends, one end of the at least two supports of the first member being coupled to one of the two opposing side rails of the first member and the other end being coupled to the other of the two opposing side rails of the first member; and
a second member contacting the first member, and for positioning the component between the first member and the second member, the second member including:
two opposing side rails positioned opposite and parallel to one another, the two opposing side rails of the second member configured to be positioned on and configured for contacting the two opposing side rails of the first member; and
at least two supports extending between and coupled to each of the two opposing side rails of the second member, the at least one support configured for contacting the plurality of removable features formed on the second surface of the component, wherein the at least one support contacting the plurality of removable features when the two opposing side rails of the second member contact the two opposing side rails of the first member, wherein the at least two supports of the second member have ends, one end of the at least two supports of the second member being coupled to one of the two opposing side rails of the second member and the other end being coupled to the other of the two opposing side rails of the second member, and wherein the at least two opposing side rails of the first member are configured for directly contacting the two opposing side rails of the second member, when the component is disposed in the fixture.

15. The assembly of claim 14, wherein the two opposing side rails of the second member are releasably coupled to the two opposing side rails of the first member.

16. The assembly of claim 14, wherein the at least two supports of the first member for the fixture include:
   a first support extending between and coupled to each of the two opposing side rails, the first support configured for contacting a first group of removable features of the plurality of removable features formed on the first surface of the component; and
   a second support positioned adjacent the first support, the second support extending between and coupled to each of the two opposing side rails configured to contact a second group of removable features of the plurality of removable features formed on the first surface of the component.

17. The assembly of claim 16, wherein the at least one support of the second member for the fixture includes:
   a third support extending between and coupled to each of the two opposing side rails of the second member, the third support positioned substantially opposite the first support of the first member for contacting a third group of removable features of the plurality of removable features formed on the second surface of the component.

18. The assembly of claim 17, wherein the at least one support of the second member for the fixture includes:
   a fourth support extending between and coupled to each of the two opposing side rails of the second member, the fourth support positioned adjacent the third support of the second member and substantially opposite the second support of the first member to contact a fourth group of removable features of the plurality of removable features formed on the second surface of the component.

19. The assembly of claim 17, wherein the fixture further comprises:
   a third member positioned adjacent the second member, the third member including:
      two opposing side rails positioned opposite and parallel to one another, the two opposing side rails of the third member positioned on and contacting the two opposing side rails of the first member for positioning the component between the first member and the third member; and
   a fourth support extending between and coupled to each of the two opposing side rails of the third member, the fourth support positioned substantially opposite the second support of the first member to contact a fourth group of removable features of the plurality of removable features formed on the second surface of the component.

20. The assembly of claim 14, wherein each of the at least two supports of the first member for the fixture has one of:
   a first shape configured to receive the plurality of removable features formed on the first surface of the component and substantially prevent movement of at least a portion of the component, or
   a second shape, distinct from the first shape, the second shape configured to receive the plurality of removable features formed on the first surface of the component and allow movement of at least the portion of the component.

* * * * *